(12) United States Patent
Isakovic et al.

(10) Patent No.: US 7,321,367 B2
(45) Date of Patent: Jan. 22, 2008

(54) ARRANGEMENT AND METHOD FOR SPATIAL VISUALIZATION

(75) Inventors: Karsten Isakovic, Berlin (DE); Ivo Haulsen, Zeesen (DE); Boris Groth, Berlin (DE)

(73) Assignee: Fraunhofer-Gesellschaft zur Forderung der angewandten Forschung e.V., Berlin (DE)

( * ) Notice: Subject to any disclaimer, the term of this patent is extended or adjusted under 35 U.S.C. 154(b) by 478 days.

(21) Appl. No.: 10/083,626

(22) Filed: Feb. 26, 2002

(65) Prior Publication Data

US 2002/0154145 A1    Oct. 24, 2002

(30) Foreign Application Priority Data

Feb. 27, 2001    (DE) ................. 101 10 358

(51) Int. Cl.
*G06F 15/16* (2006.01)
(52) U.S. Cl. .................. 345/502; 345/1.2; 345/2.1; 345/9; 345/504; 345/520; 345/522; 345/629; 348/51; 382/154; 709/203; 709/206; 709/207; 709/209; 709/211
(58) Field of Classification Search ............... 345/501, 345/502, 504, 520, 522, 643, 541; 709/201, 709/203, 206–209, 211
See application file for complete search history.

(56) References Cited

U.S. PATENT DOCUMENTS

| | | | |
|---|---|---|---|
| 5,495,576 A | | 2/1996 | Ritchey |
| 5,666,544 A | * | 9/1997 | Matsumoto et al. ........... 712/1 |
| 5,825,336 A | * | 10/1998 | Fujita et al. ................. 345/2.3 |
| 5,894,312 A | * | 4/1999 | Ishiwata et al. ............. 345/504 |
| 5,999,944 A | * | 12/1999 | Lipkin ..................... 707/104.1 |
| 6,377,255 B1 | * | 4/2002 | Ishikawa .................... 345/418 |
| 6,608,628 B1 | * | 8/2003 | Ross et al. .................. 345/619 |

OTHER PUBLICATIONS

"Computer file," Wikipedia.org, http://en.wikipedia.org/wiki/Computer_file, last modified Dec. 4, 2005, date accessed Dec. 15, 2005.*
Cruz-Neira, et al, "Scientists in Wonderland: A Report on Visualization Applications in a CAVE Virtual Reality Environment," IEEE 1993 Smposium on Research Frontiers , IEEE (USA), p. 59-66, (May 24, 1993).
Cruz-Neira, et al, "Surround-Screen Projection-Based Virtual Reality: The Design and Implementation of the CAVE," Computer Graphics, p. 135-142, (May 24, 1993).
Pantelides, Veronica, "The RAVE, CAVE and Collaborative Virtual Environments," internet—www.soe.ecu.edu/vr/rave/RAVEtext.htm, (May 24, 2000).
Iwainsky, et al, "Lexikon der Computergrafik und Bildverarbeitung," Vieweg (Germany), p. 37, (May 24, 1994).
Andrew Woods, "Stereoscopic Presentations—Taking the Difficulty out of 3D," The 6th International Workshop on 3-D Imaging Media Technology, (2000).
"Visualisierung wissenschaftlicher Daten".
Marco Zens, "Paralleles Rendering".

* cited by examiner

*Primary Examiner*—Kee M. Tung
*Assistant Examiner*—Antonio A Caschera
(74) *Attorney, Agent, or Firm*—Hahn Loeser & Parks, LLP; David J. Muzilla

(57) ABSTRACT

An apparatus for image data computation and for synchronous data output. An arrangement for producing and reproducing two partial light images which together can be perceived as a light image having a three-dimensional effect. A method of synchronous reproduction of time image sequences by at least two image reproduction devices. The apparatus according to an embodiment of the present invention has a master-client structure. A graphics master unit and at least two graphics clients are connected together by way of a first message channel and by way thereof exchange first messages, such that computation and projection of the partial images is synchronized.

18 Claims, 9 Drawing Sheets

ARRANGEMENT AND METHOD FOR SPATIAL VISUALIZATION

The invention concerns an apparatus for image data computation and for synchronous image data output. The invention further concerns a graphics master module, a graphics client module and an image switching module. The invention further concerns an arrangement for producing and simultaneously reproducing at least two partial light images which together can be perceived as a three-dimensionally acting light image, as well as an arrangement for producing and reproducing in succession in respect of time at least two partial light images which together can be perceived as a three-dimensionally acting light image. Finally the invention concerns a method of synchronously computing and outputting image data of at least two partial images of an image.

BACKGROUND OF THE ART

The representation of images which have a three-dimensional effect is based on the reproduction of two partial images on a picture screen using stereo projection. A first partial image reproduces a scene in the way that the left eye of a viewer would see it, while a second partial image reproduces it in the way that it would appear to the right eye of the viewer. In that situation, the viewer looks through special spectacles which provide each eye only with the image which is intended for same. By virtue of separate perception of the partial images with the left eye and the right eye, the viewer has the impression of three-dimensional perception.

This effect can be produced by means of active or passive stereo projection methods. Active methods project partial images for the left eye and the right eye alternately at high frequency (about 100 Hz). The viewer wears a pair of filter spectacles whose lenses have a variable degree of transmission. The partial image which is not wanted for the respective eye is blocked out by the light transmission of the lens in question being switched synchronously to a low value for image change purposes. That can be controlled for example by means of infra-red signals by the image computation and output system. Active methods afford the advantage that basically only one projector is required for each projection surface, which projector alternately projects partial images for the left eye and the right eye.

Passive methods project the partial images for both eyes at the same time, but involving different polarization of the light. They therefore require two projectors for each projection surface, the partial images of which are always simultaneously projected onto the projection surface where they are superimposed on each other. The partial image for the left eye can be for example polarized horizontally and the partial image for the right eye vertically. Left-circular and right-circular polarization is also used. The viewer again wears a pair of filter spectacles whose lenses respectively only transmit light of one polarization direction. In the first-mentioned example the left spectacle lens would only transmit horizontally polarized light and the right spectacle lens would only transmit vertically polarized light. The partial image which is unwanted for the respective eye is blocked by virtue of its "wrong" polarization. Passive stereo projection methods can operate at lower refresh frequencies than active methods as each projector serves only one eye. For example frequencies of about 50 Hz are used.

Various arrangements with different numbers of projection surfaces are known. If two or more projection surfaces are used they are generally perpendicular to each other in order to cover a field of vision of the viewer which is as large as possible, and thereby to give him a more realistic three-dimensional impression. Two partial images are formed on each projection surface, of which partial images each respective one reproduces a part of the field of vision of an eye. If an image which has a three-dimensional effect is produced not only on four mutually perpendicularly disposed walls but also on floor and ceiling, the three-dimensional optical impression is perfect and the viewer thinks that he is "immersed" in the illustrated scene.

Polarization-maintaining scattering walls are used for image projection in passive methods. Polarization-maintaining scattering walls are commercially available both in the form of back-scattering and also light-transmitting, forward-scattering arrangements. Image projection onto the scattering wall can therefore also be effected when using passive methods from the side of the viewer or from the side of the scattering wall, which is remote from the viewer.

The use of linearly polarized light involving mutually perpendicular vibration directions of the electrical field vector has the advantage in regard to the passive methods that the suppression of the respective other polarization direction by the spectacle lenses is particularly strong. However, the proportion of "wrongly" polarized light which is transmitted by both spectacle lenses rises when the viewer inclines his head. For that reason, arrangements which also project an image having a three-dimensional effect onto the floor and/or at the ceiling basically use circularly polarized light. The disadvantage of that method is the poorer suppression of the respective "wrongly" polarized light.

In the meantime, interactive projection systems for three-dimensionally acting images are known, in which the viewer can alter the illustrated scene, by means of an input device. For example, the viewer can alter his apparent viewpoint or angle of view relative to the illustrated three-dimensional scene by means of suitable control commands and thus has the impression of moving within that scene as in an actual three-dimensional environment.

Besides one or more projection surfaces and a corresponding number of projectors, interactive systems of that kind have one or more input devices. The input devices used for example are sensors which are fixed to the head of the viewer and which make it possible to determine the direction of view, as well as pointing devices or sensor gloves. The input device and the projectors are connected to a graphics computer which, on the basis of the signals of the input device for each projector, computes the next scene which is to be illustrated and outputs it thereto.

A particularly important aspect of projection control is synchronization of the partial image projection on the different projection surfaces. To achieve the three-dimensional effect, the various partial images for the left eye and for the right eye must be respectively simultaneously visible on all projection surfaces. This means that all partial images must simultaneously represent the overall scene in one and the same phase (the same "frame"). Image computation ("rendering") for the individual partial images may therefore not "diverge" in such a way that one partial image illustrates the scene at a more advanced stage than another.

This problem is resolved in an active stereo projection system known by the trademark "CAVE" having six projection surfaces by means of an integrated computation and control system for the partial images to be projected of all six projectors. For that purpose this system uses an SGI Onyx2-computer from Silicon Graphics with twelve R10000 processors, a 4 Gigabyte working memory and a graphics unit with three InfiniteReality Graphics Pipes, each of which includes two raster managers with 64 Megabyte working memory.

The disadvantage of that system is that the computation and control system used is a highly developed expensive special item which is cost-intensive in terms of procurement and maintenance.

SUMMARY OF THE INVENTION

The object of the invention is to provide an apparatus for image data computation and for synchronous image data output, which can be produced at low cost.

In accordance with the invention that object is attained by an apparatus for image data computation and for synchronous image data output having the features of claim 1. Further independent and respectively separately patentable aspects of the concept of the invention constitute a graphics master module, a graphics client module, an image switching module, an arrangement for producing and simultaneously reproducing at least two partial light images which can be perceived together as a light image having a three-dimensional effect, an arrangement for producing and reproducing in succession in respect of time at least two partial light images which can be perceived together as a light image having a three-dimensional effect, and a method of synchronously computing and outputting image data of at least two partial images of an image.

The apparatus according to the invention for image data computation and synchronous image data output has a master-client structure. A graphics master unit—hereinafter also referred to for the sake of brevity as the graphics master—and at least two graphics client units—for the sake of brevity referred as graphics clients—are connected together by way of a first message channel and interchange messages with which synchronization of their processes is achieved. The concept of the invention permits a structure which is substantially simplified in comparison with known apparatuses and which also permits production of the apparatus at low cost.

The graphics master unit has a first random access memory in which a first scene graphics data file is stored. The term scene graphics data file is used to denote a file with definitions of objects and/or events which can be illustrated in an image and in which object or event parameter values are associated with the objects and/or events. Scene graphics data files can be produced in different file formats, for example VRML, X3D, Inventor or Performer. The random access memory can be for example in the form of an RAM module in order to be able to carry out the writing and reading processes particularly quickly.

The apparatus according to the invention preferably has one or more signal inputs for external input devices, by way of which for example a viewer can influence the image being illustrated. The signal inputs are connected to the graphics master unit and influence the re-computation, implemented cyclically thereby, of the object and/or event parameter values of the first scene graphics data file, into which the hitherto applicable object and/or event parameter values also pass.

During or after re-computation of the object and event parameter values the graphics master produces a first message which it then sends by way of the first message channel to all connected graphics clients. The first message, also referred to as an update message, includes at least a part of the freshly computed object and/or event parameter values. Not all parameter values have to be communicated in each cycle to the graphics clients, as will be described in greater detail hereinafter. The communicated object and event parameter data involve for example values, freshly computed by the graphics master, of the fields of nodes of a scene graphics data file produced in the file format VRML (Virtual Reality Modeling Language).

Each graphics client unit—also referred to for the sake of brevity as a graphics client—which is connected to the graphics master has a second random access memory into which a second scene graphics data file is loaded. The second scene graphics data file is a copy of the first scene graphics data file with the object and event parameter values which were last communicated from the graphics master. Therefore the first and second scene graphics data files are generally identical. The object and event parameter values of the second scene graphics data file are in contrast delayed by one computation cycle with respect to the values of the first data file.

The object and event parameter values contained in the received update message are stored by the graphics client unit in the second scene graphics data file, in which case the previous values are overwritten insofar as updated values for same are contained in the update message. The graphics clients therefore update their second scene graphics data file in the respective second random access memory with each update message from the graphics master. The graphics master is always one step ahead with the computation.

On the basis of the second scene graphics data file each graphics client computes image data of an image and sends a second message, hereinafter also referred to as the "computation finished" message, to the graphics master unit by way of the first message channel, which signals conclusion of the image data computation procedure in respect of the image. The image data produced are delivered at an image data output.

The image data produced by the graphics clients preferably involve raster image data. An image in the form of pixels arranged in matrix form are defined with raster image data. Each pixel can be identified by its matrix co-ordinates. Additionally associated therewith are chrominance or luminance values in one of the current color systems (for example RGB).

The computed image data can be modified in subsequent remapping procedures by the graphics clients. For example, in the case of stereo projection, a partial image, for example for the left eye, can be divided by the associated graphics client into two or more partial image portions which are to be reproduced on a corresponding number of projection surfaces which are disposed in angular relationship with each other. For that purpose, for one or both partial image portions, conversion of the image data in question is effected in dependence on the arrangement of the projector relative to the projection surfaces and the angle between the projection surfaces, in such a way that the angle between the projection surfaces cannot be detected on the part of a viewer of the projected partial image portions.

The input of the "computation finished" message from all graphics clients causes the graphics master to again update the object and event parameter values of the scene graphics data file and thus to start a fresh image computation cycle.

Re-computation of the object and event parameters of the first scene graphics data file by the graphics master can be effected while the graphics clients are executing the image data computation on the basis of the last-communicated parameter values. The apparatus according to the invention involves an approximately uniform loading of the graphics master unit and the graphics client units connected thereto.

The respective computation processes are therefore of approximately equal length so that overall the result achieved is an optimum computation speed which permits high image refresh rates.

Nonetheless, by virtue of possibly different image contents in respect of the images to be computed by the graphics clients, the possibility cannot be excluded that different computation durations occur in relation to graphics master and graphics clients, or in the comparison of the graphics clients. An essential advantage of the apparatus according to the invention is that image data computation and image data output are always simultaneously started by the graphics client units, on the basis of exchange of the stated messages. Therefore all graphics clients always compute their image on the basis of the same object and event parameter values. If the image computation procedure of one graphics client is delayed the graphics master waits for the conclusion of the delayed image computation procedure before all graphics clients simultaneously receive a fresh update message. "Divergence" of the graphics clients is not possible in the case of the apparatus according to the invention. That is important in regard to each output of variable images in the form of a plurality of partial images by a plurality of projectors. For, this ensures that the outputted partial images are always synchronously computed and outputted.

There is no need for the graphics master unit and the graphics client unit to be integrated into one device. On the contrary, the apparatus precisely enjoys its advantages if the graphics master unit and the graphics client units are separate from each other, for example being implemented on different computers.

In actual fact, the apparatus according to the invention can be implemented on PCs with off-the-shelf hardware equipment, which are connected together by way of a standard Ethernet network. One PC operates as the graphics master and a further PC can be provided for each graphics client. The graphics master and the graphics client can be implemented in the form of software modules. A further embodiment involves an integrated software package which permits a selection between the master or the client functionality.

The use of off-the-shelf PC hardware has the advantage that individual components such as graphics card, processor and so forth can be replaced in the course of time without any problem by more powerful, inexpensive models. As a result the system can always be kept at the currently highest status of power and efficiency, at low maintenance costs.

The apparatus according to the invention is suitable for active and passive stereo projection methods. The above-described parameter and image data computation procedure is independent of the projection method. A first graphics client computes a first partial image which reproduces the field of vision of the left eye and a second client computes a second partial image which reproduces the field of vision of the right eye. If there are a plurality of projection surfaces the apparatus correspondingly has for each further projection surface two further graphics clients which execute the partial image computation procedure for the left eye and the right eye respectively. The parameter values required for that purpose in respect of the camera position for the left eye and for the right eye are computed by the graphics client unit on the basis of the object and event parameter values communicated by the graphics master unit, by means of simple algorithms. The graphics master unit can basically send an update message for each partial image, but it preferably does this only every two partial images after a partial image of the current scene has been computed and outputted for each eye by the respective graphics client in question. In active and in passive stereo projection, the partial image data can be outputted simultaneously by the various graphics clients. Alternate projection of the partial images for the left eye and the right eye, as is required in active stereo projection, is controlled by downstream-connected units. That will be discussed in greater detail hereinafter.

The arrangement according to the invention can also be operated for active stereo projection onto a projection surface with only one graphics master and one graphics client. Both units can then be integrated in one computer, as an alternative however for better load distribution this can also be implemented on two computers.

Use of the apparatus according to the invention is not limited to stereo projection arrangements for the reproduction of images with a three-dimensional effect. It can be used for any form of synchronous projection by means of a plurality of projectors. For example, two-dimensional image simulations can also be synchronously reproduced on a plurality of projection surfaces in one room or in different rooms. The graphics master and the graphics clients communicate by way of a network.

In an embodiment of the apparatus according to the invention the graphics master unit is additionally adapted to produce a third message or communication and to send the third message to each graphics client unit after reception of the second message by each graphics client unit. Each graphics client unit connected to the graphics master is additionally adapted to output the image data at the image data output after reception of the third message. In this embodiment, the graphics clients wait with output of the image data until the third message is received, which is therefore also referred to as the "image change" message. This embodiment ensures synchronous image data output, with transmission of the additional third message.

In a preferred embodiment there is a third random access memory to which the graphics master unit has writing and reading access. The third random access memory is preferably a mass store in the form of a magnetic hard disk which can accommodate many different scene graphics data files. If the graphics master unit is implemented on a conventionally equipped PC, regions of the hard disk thereof can be used for receiving scene graphics data files. The third random access memory is connected to the second random access memory so that a scene graphics which is to be currently represented can be loaded before the beginning of the first parameter computation procedure from the third into the second random access memory. Storage of a version of the scene graphics stored on the third random access memory, which version has been altered by up-to-date parameter values, is also possible. Finally the scene graphics data file on the third random access memory can also be modified from the exterior independently of the current image computation procedure.

Associated with each scene graphics data file contained in the third random access memory is a respective memory address (URL) and/or a scene graphics identification number or index. The scene graphics identification number serves primarily to distinguish various versions of a scene graphics data file and is therefore preferably only added to the URL in cases in which the URL alone is not adequate for clear identification of a scene graphics data file to be loaded.

Preferably, the graphics master unit and the graphics client unit are adapted to implement real-time image computation. In that way, when representing images which have a three-dimensional effect, user interaction is converted into a change in the scene being represented, by way of an input device connected to the graphics master, without perceptible delay. In actual fact, there is a delay of one frame in accordance with an image computation cycle as the graphics master is always ahead of the graphics clients by a cycle. This however involves a delay period in the region of a maximum of 20 ms with an image refresh rate of 50 Hz which can be further shortened by setting a higher image refresh rate. It is not perceptible to a person viewing the scene.

The graphics client unit and the graphics master unit preferably have the functional features of a browser for the data file format VRML, Inventor, Performer and/or X3D. In an embodiment of the invention the graphics master unit and the graphics client unit are respectively based on an Open-Source VRML-browser (Blaxxun 2.0).

A preferred embodiment of the invention has a second message channel. As in the case of the first message channel, this may involve a logical message channel which physically for example can be embodied by a conventional Ethernet network connection.

A synchronization master unit which is connected to the graphics master unit and synchronization client units communicate by way of the second message channel, wherein each graphics client unit is connected to a synchronization client unit.

The synchronization master unit is adapted to produce a fourth message or communication which contains the memory address of a scene graphics data file and/or the scene identification number of the scene graphics data file, and to send the fourth message by way of the second message channel. That is effected for example at the beginning of the image data computation.

The synchronization client units are adapted to receive the fourth message and then to cause loading of the scene graphics data file defined in the fourth message into the second random access memory and to produce and send a fifth message or communication which signals the conclusion of loading of the scene graphics data file, to the synchronization master unit.

By virtue of the transmission of the fourth and fifth messages by way of the second message channel, the graphics master and graphics client are relieved of the load of communication processes which do not have anything to do directly with image computation. Such tasks are taken over by the synchronization master and client unit.

In a further preferred embodiment of the invention the synchronization master unit and the synchronization client unit respectively are additionally adapted to produce a first test message and a second test message respectively. In this embodiment, the synchronization master and client are further adapted to produce a first test response message after reception of the second test message by way of the second message channel and to produce a second test response message after reception of the first test message and to send the respective test and test response messages by way of the second message channel.

The second message channel (see also reference numeral 80 in FIG. 5) serves to make and maintain the communication between the synchronization and graphics master unit on the one hand and the synchronization and graphics client on the other hand, and to transmit use-specific commands of the graphics master, for example browser commands. With the test message and the test response message, a check is made as to whether there is a communication connection between master and clients.

As the first and second message channels are admittedly logically different but can basically be embodied by one and the same physical connection (network card, network cable), it is possible with that test message to check the existence of a communication both on the first and on the second message channel.

In a further preferred embodiment of the apparatus according to the invention, which is particularly suitable for use in relation to passive stereo projection, for conversion of the image data computed by the graphics clients into control signals for an image reproduction device, associated with each graphics client unit is a respective graphics computing unit having a data input for image data, by way of which input it is connected to the associated graphics client unit. Each graphics client unit is adapted to convert image data received at the input into control signals and to output the control signals by way of a signal output. A light image projector can be connected to the signal output. By way of example, commercially available PC graphics cards can be used as the graphics computing unit.

In comparison, a further embodiment which is designed for image data computation and output in relation to active stereo projection involves only slight differences. The graphics clients, for active stereo projection, are adapted for alternately computing and outputting firstly a (partial) image for the left eye and then a (partial) mage for the right eye, which are outputted to a graphics computing unit. This controls the projector in accordance with the flow of the incoming image data in regard to the alternate projection of a respective partial image for the left and right eyes. The graphics master unit can basically send a fresh update message for each partial image, but it preferably does this only every two partial images as, for each eye, a partial image of the current scene was computed and outputted by the graphics client in question.

The required parameter values of a "camera position" for the left and right eyes are computed by the graphics client unit in active and in passive stereo projection on the basis of the object and event parameter values communicated by the graphics master unit, by means of simple algorithms.

An embodiment as an alternative thereto of the invention for active stereo projection also involves distribution in active stereo projection of the load of the image data computation of the partial images for the left and right eyes to two graphics client units per projection surface. This embodiment is the same in terms of the structure of the graphics master and clients as the embodiment for passive stereo projection. However, two graphics clients share a graphics computing unit and a light image projector. Instead this embodiment additionally has a partial image switching unit for each two graphics client units. The partial image switching unit has a signal input, by way of which it can be connected to a switching control unit, at least one first and at least one second image data input which are associated with a respective graphics client unit, a first and a second image data intermediate memory connected to the first and second image data input respectively, and an image data output for each pair of first and second image data inputs. The partial image switching unit is adapted to connect either of the first or the second image data intermediate memories to the image data output in dependence on the state of the signal input.

A switching control unit which is connected on the output side to the signal input of the partial image switching unit is adapted to produce and deliver at least one control signal at a predeterminable signal delivery rate.

The partial image switching unit can be adapted in dependence on the respective number of projection surfaces to be illuminated for connection to two graphics clients (one projection surface), four graphics clients (two projection surfaces), six graphics clients (three projection surfaces) and so forth. Provided for each pair of graphics clients is a respective pair of image data intermediate memories. This may also involve two, four, six, . . . memory regions of one and the same memory. A respective image data output is associated with each pair of image data intermediate memories.

The partial image switching unit receives the image data simultaneously outputted by the graphics clients, into the respective image data intermediate memory. An intermediate memory of a memory pair therefore contains a partial image for the left eye, while the other contains a partial image for the right eye. Those partial images are outputted in succession by the partial image switching unit.

For that purpose, the partial image switching unit, by way of its signal input, receives control signals from the switching control unit. A first control signal causes the partial image switching unit to output all partial images for the left eye by way of the associated image data outputs. A second control signal causes the partial image switching unit to output all partial images for the right eye by way of the same image data outputs.

The switching control unit sends its control signals at a predetermined frequency which corresponds to the image refresh rate of the projector. If for example the partial images for the left eye and the right eye are to be refreshed at a rate of 50 Hz, the first and second signals are produced alternately at a frequency of 50 Hz respectively. The signal delivery rate at the signal output of the switching control unit is then 100 Hz.

A development of this embodiment of the invention which is suitable for use in an active stereo projection arrangement has a graphics computing unit connected to the image data output of the partial image switching unit. If there are a plurality of image data outputs on the partial image switching unit, a respective graphics computing unit is associated with each image data output. The graphics computing unit is otherwise identical to that in the apparatus for passive stereo projection, and therefore has a signal output for control signals for controlling a display unit of a image reproduction device, and is adapted to convert image data received at the input into control signals and to output the control signals by way of the signal output.

In a development of the concept of the invention, the functional features of the graphics master are embodied in a graphics master module and the functional features of the graphics client are embodied in a graphics client module, which for example can each be in the form of a PC plug-in card. The structural and functional features of the graphics master module and the graphics client module can be substantially seen from the above-described features of the graphics master unit.

The graphics master module has at least one signal input adapted to receive signals of an external input device. There is also a first message interface adapted to send and receive digitally encoded messages, and a first random access memory for receiving at least one first scene graphics data file. The graphics master module also has image parameter computation means which are connected to the first random access memory and the signal input and to the message interface and which are adapted to compute object and/or event parameter values of the first scene graphics data file in dependence on the current object and event parameter values thereof and the current state of the signal input. There are also provided master control means which are connected to the image parameter computation means and the message interface and which are adapted to produce and send a first message or communication by way of the first message interface, wherein the first message contains at least a part of the computed object and/or event parameter values.

In the graphics master module according to the invention, the functional features of the above-described graphics master unit are divided to two units. The image parameter computation means perform the tasks of graphics computation while the master control means manage communication with the graphics client modules. This may involve a purely logical or an also hardware distinction. The functional features, as in the case of the graphics master unit, can be embodied in the form of implemented software or in the form of specially adapted ASICs.

Various embodiments of the graphics master module according to the invention have the additional features of the above-described embodiments of the apparatus according to the invention for image data computation and synchronous image data output. In a preferred embodiment there is provided a synchronization master unit having the above-described structural and functional features.

The graphics client module according to the invention has a second message interface adapted to send and receive digitally encoded data; a second random access memory for receiving at least one second scene graphics data file which defines objects and/or events which can be represented in an image and which associates object and event parameter values respectively with the objects and/or events, and an image data output. Also provided are image data computation means which are connected to the second message interface and the second data memory and which are adapted to store the object and/or event parameter values received at the second message interface in the second scene graphics data file and to produce image data of an image in dependence on current object and/or event parameter values of the second scene graphics data file, and to output the produced image data at the image data output. Communication with a graphics master module is afforded by client control means which are connected to the message interface and to the image data computation means and which are adapted to produce and send a second message to the graphics master unit by way of the second message interface, which signals conclusion of the image data computation for the image.

The graphics client module can also have the additional features of the graphics client unit in the above-described embodiments of the apparatus according to the invention for image data computation and synchronous image data output. In particular it can have a synchronization client unit having the above-described features.

An independently patentable concept of the invention concerns an image switching module comprising at least one first and at least one second image data input, associated with each pair of first and second data inputs an image data output, a first and a second image data intermediate memory which is associated with the first and the second image data input respectively and which at the input side is connected to the first and the second image data input respectively and which is adapted to store image data and to output stored image data by way of the associated image data output in response to a first and a second control signal respectively. In addition the image switching module has a switching control unit having a signal output by way of which it is connected to the first and second image data intermediate memories and which is adapted to produce and deliver the first and second control signals in alternate succession at a predeterminable signal delivery rate.

The image switching module integrates the above-described partial image switching unit and switching control unit which is used in an apparatus in accordance with the invention and which is employed in relation to active stereo projection. The image switching module, like the graphics master and client module, can be embodied in the form of a plug-in card. It is also possible to envisage a structural design in the form of a separate device with its own power supply. The signal delivery rate can be set from the exterior and preferably corresponds to the image refresh rate which is predetermined by the graphics master and the graphics client.

In a preferred embodiment, for the connection of a pair of shutter spectacles for a viewer, the switching control unit is adapted to additionally deliver the first and second control signals in the form of electromagnetic radiation, in particular infra-red radiation. It will be appreciated that the delivery of radiation at a lower frequency for radio transmission is also possible and would afford the advantage that there does not have to be sight contact between the viewer and the switching control unit.

Arrangements for producing and reproducing two partial light images which together can be perceived as a light image having a three-dimensional effect, for active and for passive stereo projection, are to be viewed as further independent aspects of the concept of the invention.

Passive stereo projection is embodied in an arrangement for producing and simultaneously reproducing at least two partial light images which together can be perceived as a light image having a three-dimensional effect. That apparatus has at least one scattering surface which is adapted for polarization-maintaining scattering of light into a spatial region which in relation to light incident on the scattering surface extends either in front of or behind that surface.

The scattering surface for a back-scattering arrangement is preferably metallic. It can be vapor deposited on a support surface or can be in the form of a self-supporting layer, in the form of a plate or panel. In contrast to back-scattering, forward scattering is not necessarily limited to a surface, that is to say a region of small extent in the direction of light incidence.

The arrangement has two light image projectors associated with a respective scattering surface, as image reproduction devices, which each have a control input and which are adapted to convert a respective number of control signals received at the control input into a respective raster light image which is composed in matrix form of light pixels and to project the respective raster light image, using polarized light, wherein the polarization of the light respectively used by the two projectors is oriented differently, and which are arranged to project the respective raster light image onto the associated scattering surface.

In addition, the arrangement according to the invention has an apparatus for image data computation and for synchronous image data output in an embodiment which is designed for passive stereo projection. In this case, provided in association with each light image projector is a respective graphics client unit, wherein the signal output of the respective graphics computing unit is connected to the control input of the respective light image projector. In addition each graphics client unit is adapted to compute raster image data of a partial image, which reproduces the field of view of the left or right eye of a viewer, of an image defined by the current object and/or event parameter values of the second scene graphics data file.

The arrangement according to the invention has the advantage over known arrangements that it can be embodied with substantially simpler and substantially less expensive components. That can be seen on the one hand from the foregoing description of the apparatus according to the invention for image data computation and synchronous image data output. On the other hand, the arrangement according to the invention can use comparatively favorable light image projectors, that is to say for example LCD (liquid crystal display) or DLP (digital light projection) projectors. In this connection, the term light image is used to mean a projected image. The use of CRT-projectors is also possible, but suffers from the disadvantage that this type of projector is substantially more expensive and is suitable solely for active stereo projection.

In two alternative embodiments of the apparatus according to the invention the light image projectors can be so arranged that they form the partial images on the scattering surface either from the front or from the rear, from the point of view of the viewer. Specially designed scattering walls can be obtained for illumination from the rear, that is to say in relation to forward scattering by the scattering surface. The arrangement of the light image projectors behind the scattering surface, from the point of view of a viewer, in this embodiment, admittedly suffers from the disadvantage that overall more space is required for the arrangement. Scattering walls for forward scattering are also more complicated and expensive to produce. Instead however, it is also possible for the floor and the ceiling also to be in the form of a scattering surface. That is not possible when the projectors are arranged on the side of the viewer, as it is not possible to prevent the viewer from throwing a shadow onto the floor or the ceiling and thus interfering with image projection.

For the sake of simplicity, in an embodiment of the invention, the projectors each have a respective polarizer. The polarizers of the projectors for the left and the right eyes of the viewer are transmissive for linearly polarized light with preferably mutually perpendicular vibration directions. In that way it is possible to achieve optimum contrast between the partial images for the left eye and the right eye. Alternatively, it is also possible to use filter arrangements for the projection of right-elliptical or left-elliptical or right-circularly or left-circularly polarized light respectively.

Provided for the viewer is a suitably designed pair of analyzer spectacles whose lenses are transmissive in respect of light each with a respective form of polarization predetermined by the light image projectors. In this respect, the association of the projected partial image with the eye is taken in account when arranging the filters in the spectacles.

A further aspect of the concept of the invention involving independent patentability concerns an arrangement for active stereo projection which is adapted to produce and reproduce in succession in respect of time at least two partial light images which together can be perceived as a light image having a three-dimensional effect. That arrangement according to the invention has at least one scattering surface adapted to scatter light into a spatial region which in relation to light incident on the scattering surface extends either in front of or behind the scattering surface.

The demands in relation to the scattering surface are lower in regard to active stereo projection as polarization of the scattered light does not have to be maintained. It is thus possible to use conventional projection screens or glass-based or plastic-based scattering walls.

In contrast to the arrangement for passive stereo projection, it is sufficient in the case of the present arrangement to have a light image projector associated with a respective scattering surface, as the image reproduction device which in other respects can be designed precisely as described above. It is however also possible to use a plurality of projectors, for example if images are to be projected for different viewer positions.

As a further difference in relation to the arrangement for passive stereo projection, provided here is an apparatus for image data computation and for synchronous image data output, which is designed in accordance with the requirements of active stereo projection, as described above. In this respect, associated with each light image projector it has a first and a second graphics client unit (98), with the image data output of the respective graphics client unit being connected to the first and second image data input of the partial image switching unit. The first and second graphics client units are respectively adapted to compute raster image data of a partial image, which reproduces the field of view of the left and the right eye respectively of a viewer, of an image which is defined by the current object and/or event parameter values of the second scene graphics data file.

In accordance with a further concept of the invention involving independent patentability, used for image reproduction is an apparatus for image reproduction by backscattering of light, comprising a first and a second flat scattering surface, wherein the planes defined by the scattering surfaces include an angle, characterized in that the first and second scattering surfaces adjoin with mutually facing edges a third flat scattering surface in such a way that the third scattering surface adjoins the first and second scattering surfaces respectively at obtuse angles and that the straight intersection lines of the planes defined by the three scattering surfaces extend in mutually parallel relationship.

The inclusion of a third scattering surface which at both ends of its widthwise extent adjoins the respectively adjacent scattering surfaces at an obtuse angle has the advantage that unwanted light scatter which is visible to the viewer from the first scattering surface onto the second scattering surface in the corner region is avoided. That effect appears in particular in arrangements in which the first and second planes include an obtuse or a right angle.

Preferably the third scattering surface has a widthwise extent of at least 60 cm. With a smaller widthwise extent, the spacing between the first and second scattering surfaces in the corner region is not sufficient to make the troublesome scattering effect completely invisible. In an embodiment of such a design configuration, the scattering surface involves a widthwise extent of 80 cm and adjoins each of the first and second scattering surfaces at a respective angle of 130 degrees.

In this arrangement the graphics client unit is adapted to compute and output two respective partial image portions in such a way that a partial image portion appears free from distortion on the first or second projection surface and that a second partial image portion appears free from distortion on the third projection surface ("remapping"). To compensate for image projection with an inclined direction of light incidence on the third scattering surface, this embodiment provides that the structures illustrated in the second partial image portion are turned by computation, having regard to the angle of the scattering surfaces. In addition the position of the projector relative to the third scattering wall is incorporated into the remapping procedure. When the partial image portions are projected onto the respective scattering surface, the angle between the scattering walls is not perceptible.

Another embodiment involves implementing expansion of the last-described graphics client functionality to the computation of more than two partial image portions. In that way for example in constricted conditions in regard to space, a plurality of scattering walls which are disposed at an obtuse angle relative to each other, involving a small widthwise extent, can be illuminated by a pair of projectors.

BRIEF DESCRIPTION OF THE DRAWINGS

Further embodiments by way of example of the invention are described hereinafter with reference to the drawing in which.

DETAILED DESCRIPTION OF THE INVENTION

Figure 1:
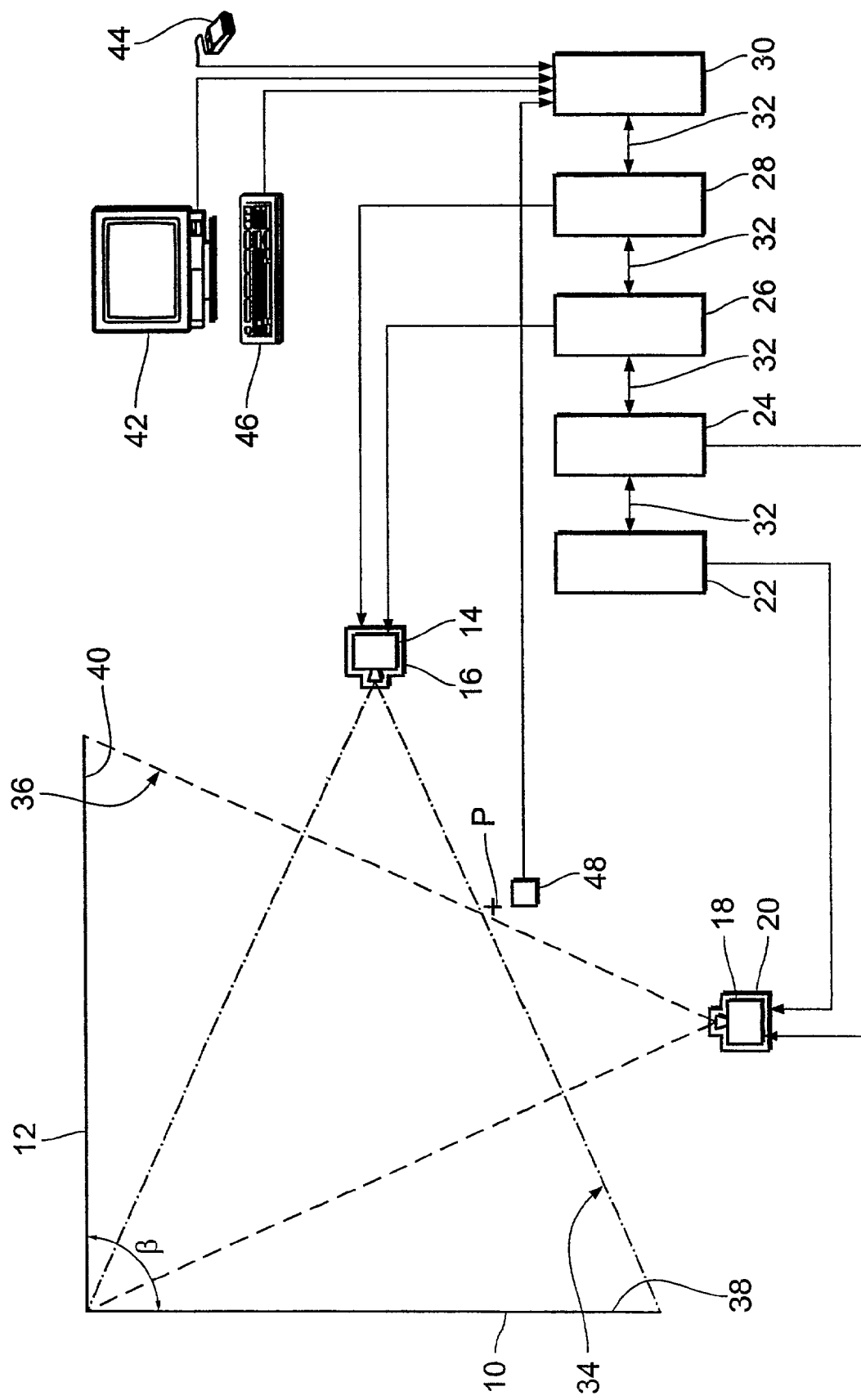
FIG. 1 shows a simplified sketch of a first embodiment of an arrangement for producing and reproducing two partial light images which together are perceptible as a light image having a three-dimensional effect.

FIG. 1 shows a simplified plan view of a first embodiment of an arrangement for spatial visualization. The arrangement is designed for stereo projection from the direction of the viewer (front projection). The stereo effect is produced passively and can be perceived by a pair of polarization filter spectacles.

This arrangement has two screens 10 and 12 which are set up at a right angle, four projectors 14 through 20 and a graphics computer system of 5 networked computers 22 through 30. The network connection between the computers 22 through 30 is indicated by the double-headed arrows 32.

The screens 10 and 12 (hereinafter also referred to as scattering walls) are set up at a right angle β and are in immediately adjoining relationship without gap. They can be fixedly or releasably connected together in the region of the angle β. Releasable erection of the screens has the advantage that the walls can be freshly positioned relative to each other as desired for experimentation purposes. Thus it is possible for example to alter the angle β between the screens. However, using suitable connecting elements such as hinges means that it is also possible to provide that the screens are pivotable relative to each other in order to set any desired angle β between them. In the case of installations which are subjected to a high level of public involvement however a fixed connection between the screens without the possibility of pivotal movement is advantageous in order to ensure that the screens are not disarranged relative to each other if touched.

The scattering walls are preferably set up at an angle β of between 90 and 180 degrees because in that way the viewer is outside the light cones 34 and 36 produced by the projectors 14 through 20 and does not throw any shadow. In principle however an arrangement with an acute angle is also possible.

In the present example the screens 10 and 12, on their sides towards the projectors 14 through 20, have polarization-maintaining scattering surfaces 38 and 40 as are usual for 3D-representation. For that purpose the scattering surfaces 38 and 40 are made from metal. The light projected onto the scattering surfaces is reflected thereby into the entire half-space which is towards them, without changing the direction of polarization of the incident light. In that way, light which is scattered with a polarization-maintaining effect reaches a viewer at various positions in front of the scattering walls, from all portions of the scattering surfaces 38 and 40 which are illuminated by the projectors 14 through 20.

The scattering surfaces 38 and 40 can be in the form of a one-part or multi-part metal layer applied to a support. The support for example can be made from plastic material. Alternatively the entire scattering wall 10 or 12 can be made from metal.

The scattering surfaces 38 and 40 are flat. If the scattering surfaces used are curved throughout or in a portion-wise manner, the impression caused thereby involving image distortion can be corrected by computer adaptation of the projected scene.

The dimensions of the scattering walls 10 and 12 in the present embodiment are (width×height) 3.30 m×2.50 m. Scattering walls of the "Miracle 3D silverscreen" type are used. In the present arrangement the amount of space required is limited to (width×depth×height) 5×5×2.5 m³.

Associated with each screen 10 and 12 are two projectors 14 and 16, 18 and 20 respectively. The description hereinafter is limited to the arrangement of the projectors 14 and 16 relative to the screen 10. The arrangement of the projectors 18 and 20 relative to the screen 12 is similar. The projectors 14 and 16 are so arranged and oriented that they project light images of dimensions which are identical on the scattering surface 38. The light images cover the scattering surface 38 to precisely the right edge thereof where the scattering surface 38 adjoins the scattering surface 40 of the screen 12. Both projectors are arranged at the same spacing relative to the scattering surface and approximately centrally with respect to the widthwise extent thereof.

The representation of the projectors in FIG. 1 with different contours does not correspond to their respective actual dimensions, but serves solely to make the two projectors clearly apparent in the selected plan view.

The projectors can be arranged on a support tripod or arranged hanging from the ceiling of the room on a support fixed to the ceiling. In the preferred embodiment both projectors 14 and 16 are arranged hanging down from the ceiling.

For the purposes of precise orientation of the projectors they are fixed displaceably independently of each other parallel to the widthwise extent of the screen 10 and in the direction of their spacing relative to the screen. In addition the projectors are each pivotable about the respective vertical axis and about a respective horizontal axis which is perpendicular to the line normal to the scattering surfaces 38 and 40.

The two projectors are commercially available LCD, DMD or DLP projectors. It is possible for example to use type MP8750 from . . . The light output is 1300 ANSI lumen and the resolution is 1024×768 pixels. The projectors used have an image correction unit which compensates for trapezoidal aberrations on the scattering surface as a result of the inclined incidence of light.

Polarization filters (not shown here) are disposed upstream or downstream of the projection lenses of the projectors 14 and 16 (and likewise in relation to 18 and 20). The polarization filters of the projectors 14 and 16 allow light to pass therethrough in different polarization directions. For example the polarization filter of the projector 14 allows linearly polarized light to pass, the electrical field vector of which vibrates on the scattering surface in a horizontal direction, that is to say parallel to the plane of the drawing in FIG. 1. In this case the polarization filter of the projector 16 passes linearly polarized light whose electrical field vector vibrates on the scattering surface in a vertical direction, that is to say perpendicularly to the plane of the drawing.

The light of the projectors which respectively project the light for the left eye onto the screens 10 and 12, in the present case for example the light of the projectors 14 and 18, involves the same polarization direction (horizontally). The same applies for the light of the projectors 16 and 20 which is polarized vertically. Accordingly the viewer wears a pair of spectacles which at the left only allows horizontally polarized light to pass therethrough and at the right only vertically polarized light.

Alternatively the polarization filters of the projectors 14 and 16 can also transmit left or right circularly polarized light. In that case the pair of spectacles of the viewer would also have to be provided with suitable polarization filters for left and right circularly polarized light for the left eye and the right eye respectively.

Associated with each projector is one of the graphics computers (client) 22 through 28. The graphics computers are conventionally equipped Personal Computers (PC). A typical setup has inter alia for example the following components:

1 processor of type AMD Athlon, running at a clock rate of 900 MHz,
512 MBytes of working memory (RAM),
1 graphics card GeForce2 GTS with 64 MBytes of DDR RAM, and
100 Mbits/s Ethernet network card.

A hard disk can be provided for local booting of the clients 22 through 28, but in principle is not required as the clients can also be booted by way of the network by means of a master computer 30 which is described hereinafter.

Each projector 14 through 20 is connected to the output of the graphics card of the associated graphics computer 22 through 28.

In addition to the graphics computers 22 through 28, there is also a master computer (master) 30. The master computer is also a PC whose hardware equipment is the same as that of the graphics computers 22 through 28, as regards the above-mentioned components. In addition the master computer 30 has a hard drive. Furthermore, it is designed for the connection and operation of a monitor 42, a mouse 44 and a keyboard 46. Further input devices can be connected to the master 30—also in a cord-less manner, for example by way of an infra-red or radio interface—and are symbolically indicated in FIG. 1 by a block 48. This involves for example a cord-less gyroscope mouse. An alternative input device 48 is a data glove whose output signals supply the master 30 with items of information regarding movements and position of the fingers of a hand. As the input device 48, it is also possible to provide a tracking device which, by means of electro-optical sensors, generates signals which are dependent on the position and direction of view of the eyes of a viewer, and outputs those signals to the master 30. A walking device can also be used. Finally, a microphone is also provided as an input device. By means of a speech recognition system which is integrated into the master, commands from the viewer can be interpreted and form the basis for re-computation of the fields of the currently loaded scene graphics data file. Depending on the respective use involved the above-indicated input devices can be provided alternatively or in combination.

The graphics computers 22 through 28 and the master 30 are connected together by way of standard 100 Mbits/s Ethernet network cards and network cables. They operate with a Windows 95/98/NT or Windows 2000 operating system (Networking, Threads), an OpenGL client (GLUT windows handling, Portable C++) and a UDP-network layer which permits a short latency time of less than 1 ms.

FIG. 1 does not show the Surround Sound System used, which has an amplifier (Yamaha DSP-A595 with four channels), 4 loudspeakers and 2 subwoofers in a conventional arrangement.

In the arrangement illustrated in FIG. 1 the projectors 14 and 18 project horizontally polarized light images of a scene onto the scattering surfaces 38 and 40, as the left eye of a viewer at a defined position relative to the scene would perceive them. In the arrangement shown in FIG. 1 that position corresponds to the position identified by "P". The two images of the projectors 14 and 18 for the left eye are different. They represent the left and right halves of the field of vision of the left eye and therefore supplement each other to form the total field of vision of the left eye at the defined position of the viewer. A similar consideration applies in regard to the projectors 16 and 20. The projectors 16 and 20 project vertically polarized light images of the same scene onto the scattering surfaces 38 and 40, as the right eye of a viewer at the defined position would perceive them. The projector 16 projects the left half of the field of vision of the right eye onto the screen 10 and the projector 20 projects the right half of the field of vision of the right eye onto the screen 12. The two images supplement each other to form the total of vision of the right eye at the defined position of the viewer.

From the point of view of a viewer who is at the position P in the arrangement shown in FIG. 1 and who is wearing a pair of spectacles whose left lens transmits only horizontally polarized light and whose right lens transmits only vertically polarized light the respectively projected light images correspond to the perception conditions in relation to spatial sight in reality. Therefore, that viewer has a spatial impression of the scene represented. That spatial impression is particularly strongly pronounced by virtue of a large field of vision being covered on the screens which are at a right angle to each other and which are 2.50 m in height and 3.30 m in width.

The illustrated scene is updated at a refresh rate of about 50 Hz. In that respect for example the viewer can have the impression that individual parts of the scene would be moving in space or the viewer would be moving relative to the scene. By means of the input device 48, the viewer is even in a position to himself influence the development of the scene being illustrated. With a gyroscope mouse for example he can change the apparent viewer position relative to the scene and thus gains the impression of himself moving through the scene with a floating movement or also with a walking movement when using a walking device.

Higher image refresh rates than 50 Hz do not change the image computation and projection control processes which take place and which are described hereinafter, but only the repetition rate at which they take place. The highest possible refresh rate is solely a question of the hardware equipment of the PCs 22 through 30 and the projectors. Hardware development is making great strides towards more powerful and faster processors. A refresh rate of 100 Hz which is particularly advantageous from the point of view of perception physiology can also be implemented with hardware which is available at the present time, at comparatively low cost.

What is important for producing the spatial impression of the scene is the synchronous projection of all four respective current partial images of the scene. The image computation, control and signaling processes which are being executed on the PCs 22 through 30 are synchronized in the present embodiment by means of a master/client system which is described in detail hereinafter with reference to FIG. 5.

Figure 2:
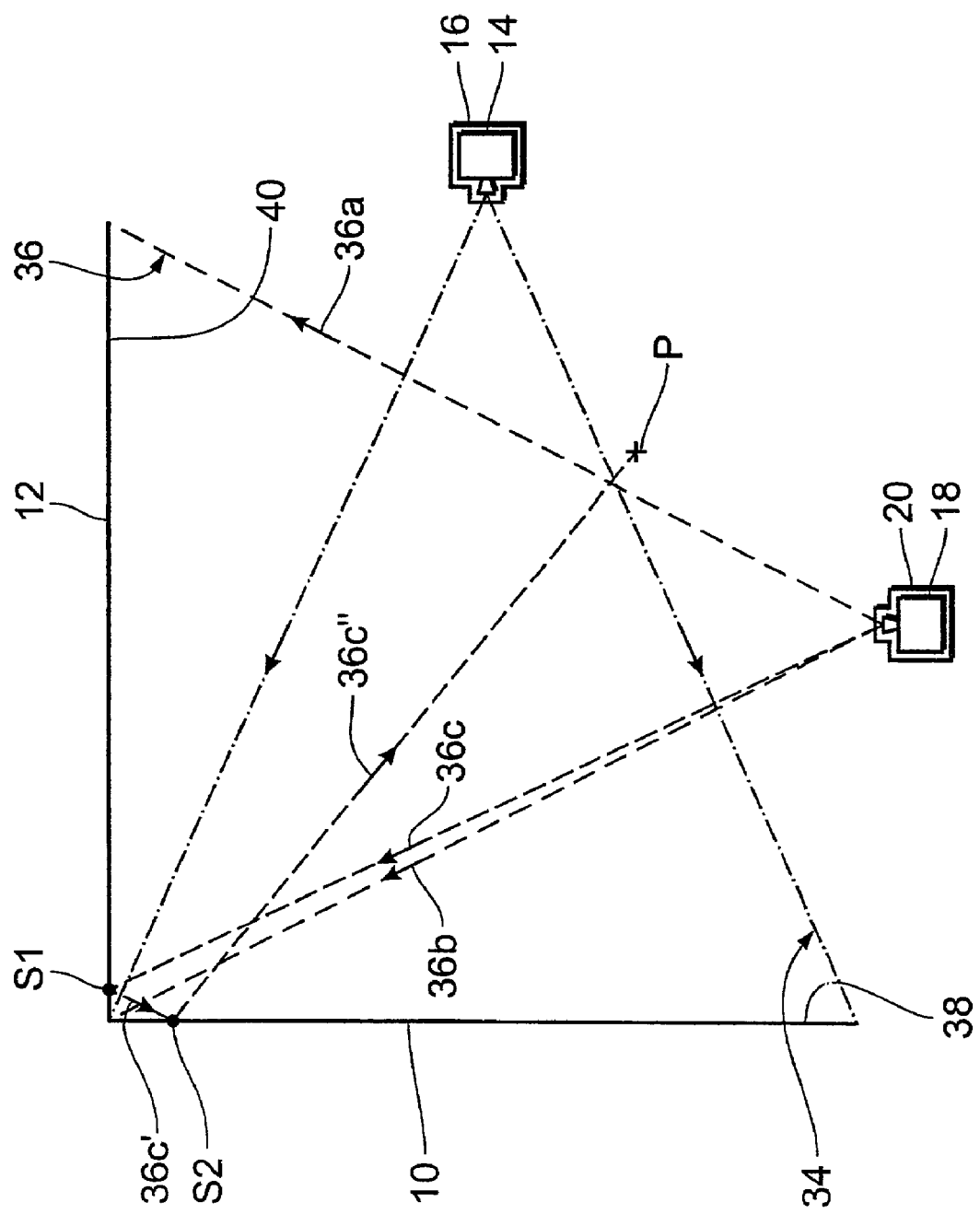
FIG. 2 is a diagrammatic view showing the principle to illustrate light scattering between screens in adjoining relationship at a right angle.

FIG. 2 shows a portion of the arrangement illustrated in FIG. 1. It includes the screens 10 and 12, the projectors 14 through 20 and the light cones 34 and 36 produced thereby. The problem of double scattering of light beams at the scattering surfaces 10 and 12 will be discussed hereinafter, with reference to the light cone 36.

Besides edge beams 36a and 36b, shown in broken lines, of the light cone 36, the drawing also shows a further light beam 36c which, issuing from the projector 18 or 20, meets the scattering surface 40 of the screen 12 at a location S1 in the proximity of its left-hand edge, where the scattering surface 38 adjoins it at a right angle. Back-scattering of the light following the beam 36b, at the scattering surface 40, takes place in a large angular region and has an intensity maximum at an angle which, in accordance with the reflection law, is equal to the angle of incidence of the beam 36c on the scattering surface 38. Therefore, a large part of the light which is incident through the beam 36c, after scattering at the scattering surface 40, follows a beam 36c' and thus impinges on the scattering surface 38 at a location S2. From there, obeying the same laws, a part of the light again passes following the beam 36c' to the viewer at the position P. As a nuisance to the viewer, that scatter light of the beam 36c" is superimposed on the light, which is scattered in the direction thereof from the location S2, of the image which the projector 14 or 16 projects onto the screen 10. That interference effect is noticeable in the corner region of the two scattering surfaces and it adversely affects the desired three-dimensional image impression.

Figure 3:
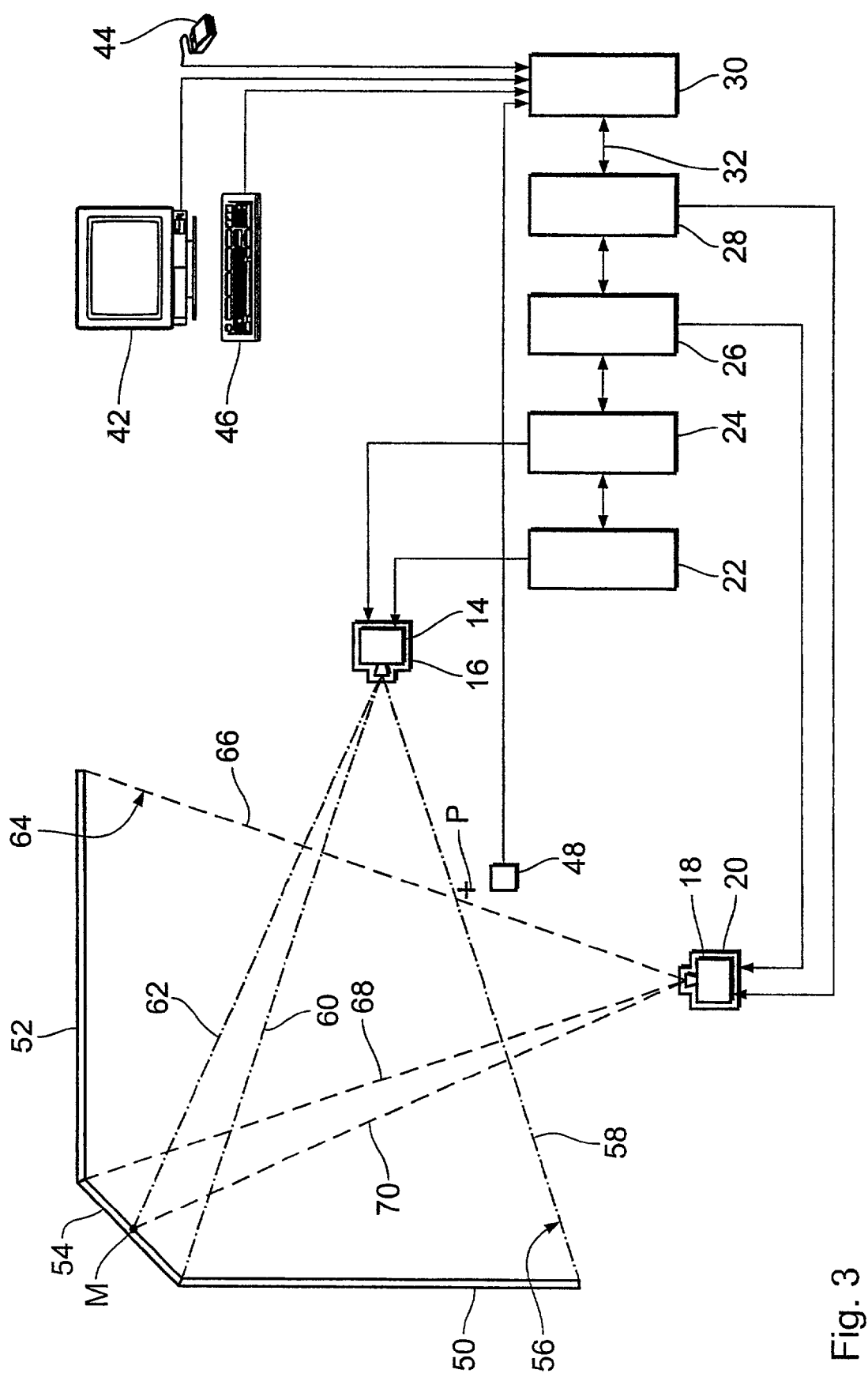
FIG. 3 shows a simplified sketch of a second embodiment of an arrangement for producing and reproducing two partial light images which together are perceptible as a light image having a three-dimensional effect.

As a way of resolving that problem, FIG. 3 shows a second embodiment of an arrangement for spatial visualization, in the form of a simplified plan view. In many features, the structure of this arrangement is the same as that of the embodiment of FIG. 1. Therefore, the same references are used for components of the present arrangement, which are the same as the first embodiment. The description hereinafter is concentrated on the differences in relation to the first embodiment.

To avoid troublesome double scattering in the corner region, the present arrangement has, between two screens 50 and 52, a third screen 54 which adjoins the screens 50 and 52 at obtuse angles $\gamma 1$ (Gamma 1) and $\gamma 2$ (Gamma 2). Connecting the screens together at an obtuse angle ensures that large parts of the light which is scattered in the corner regions of the screens are not scattered onto the respectively adjoining screen and pass from there to the viewer. To avoid multiple scattering the angles Gamma 1 and Gamma 2 should be more than 110 degrees. Viewed as an optimum arrangement is one in which both angles are 135 degrees. The screen 54 should be of a widthwise extent of at least 60 cm in order also to effectively suppress troublesome double scattering between the screens 50 and 52.

In the present embodiment the screen 54 is of a smaller widthwise extent than the screens 50 and 52, but is of the same height. A larger widthwise extent for the screens 50 and 52 is basically not necessary in order to avoid double scattering. It does however permit a larger field of vision of a viewer at the position P to be covered. The screens 50 and 52 are here about 3.3 m wide and 2.50 m high. The screen 54 is about 0.80 m wide and 2.50 m high. Otherwise, it is basically of the same structure as the screens 10 and 12 of FIG. 1. The foregoing description relating to the arrangement of FIG. 1 also similarly applies in regard to the connection of the walls 50, 52 and 54.

In the case of the arrangement shown in FIG. 3, two partial images are respectively projected by the projectors 14 and 16. A first partial image with edge beams 58 and 60 covers the screen 50, a second partial image with edge beams 60 and 62 covers the screen 54 from its left-hand edge at which it adjoins the screen 50 to a position M on the screen 54. Likewise, two partial images are respectively projected by the projectors 18 and 20. A first partial image with edge beams 66 and 68 covers the screen 52 and a second partial image with edge beams 68 and 70 covers the screen 54 from its right-hand edge where it adjoins the screen 52 as far as the position M. At the position M therefore the respective second partial images from the projectors 14 through 20 are mutually adjoining. Suitable adjustment of the projectors ensures that the images are joined seamlessly.

In the present example the position M is at the center of the widthwise extent of the screen 54. Basically it can be at any position with respect to the widthwise extent. An asymmetrical arrangement however has inter alia the disadvantage that the graphics computers associated with the projectors 14 through 20 have to compute image fields of different sizes. The time required for the image computation procedure also increases with the size of the image fields to be computed. Therefore, asymmetrical image field distribution would mean that two graphics computers are relieved of load but two others would be additionally loaded. As the image computation process which takes the longest time determines the maximum image refresh rate, as will be described in greater detail hereinafter, the symmetrical distribution of the two partial images on the screen 54 is favorable in terms of a high image refresh rate.

The angles γ1 and γ2 can be different. In the present case however they are the same and are 135 degrees. A viewer at the position P is looking in frontal relationship onto the scattering wall 54. The angles γ1 and γ2 are to be taken into consideration in computation of the light images to be projected onto the screens 50, 52 and 54, as will be described in greater detail hereinafter with reference to FIG. 4. If the angles γ1 and γ2 were different, then the graphics computers 26 and 28 would in turn have to execute different image computation processes for computation of the first and second partial images on the screens 52 and 54, from the graphics computers 22 and 24 for the partial images on the screens 50 and 54. The asymmetrical loading on the graphics computers, which is possible as a result, could adversely affect the speed of the system, as also described in the last paragraph. Therefore, an arrangement of the screens 50 through 54 involving identical angles γ1 and γ2 is preferred.

Figure 4:
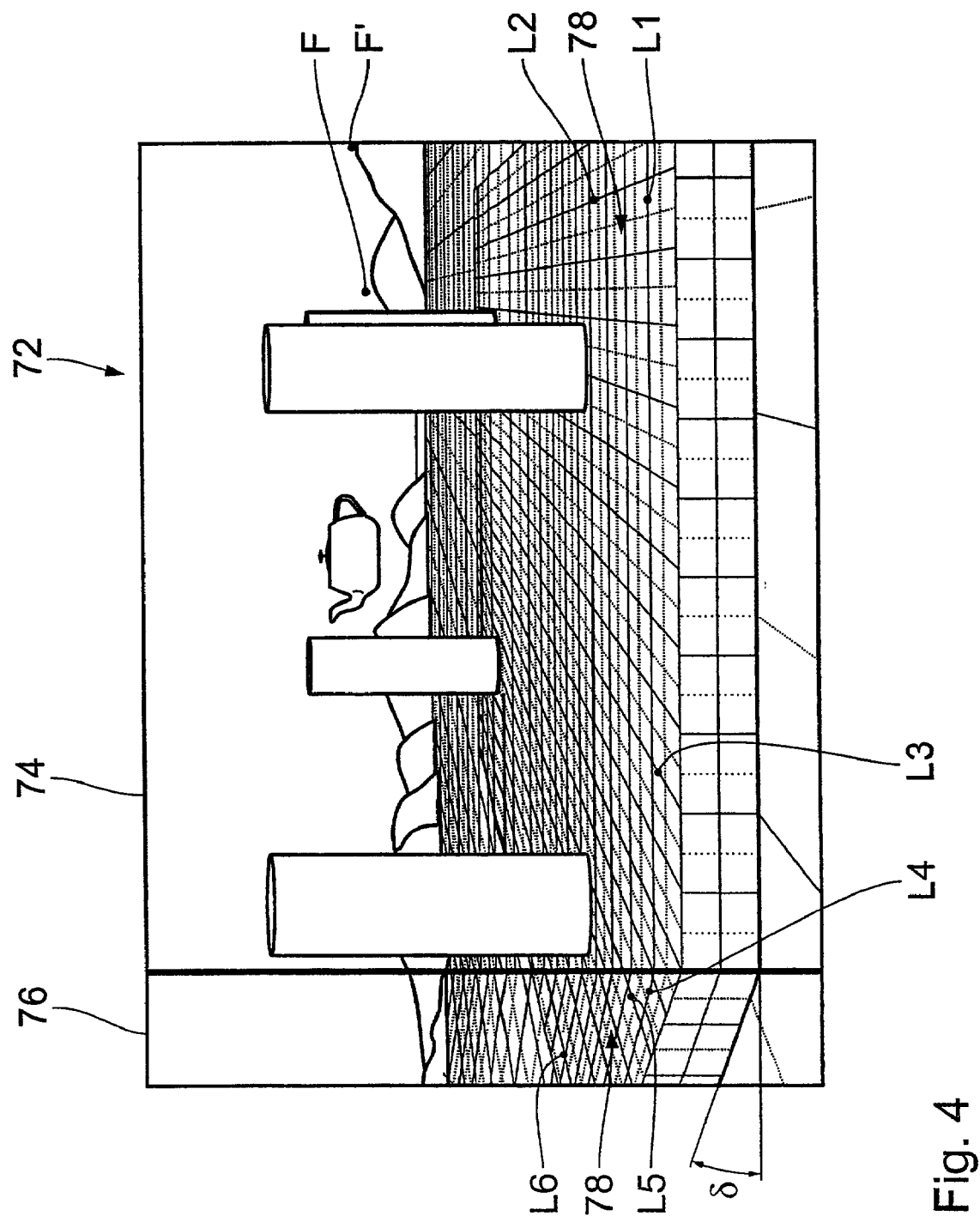
FIG. 4 shows an example of representation of an image by means of the second embodiment.

FIG. 4 shows a diagrammatic view of a light image 72 which is projected by the projector 18 onto the screen 52 as well as the right-hand half of the screen 54 between the position M and its right-hand edge. The light image 72 is subdivided into two partial images (viewports>, a main image 74 and an edge image 76. The main image 74 is of such a size that it illuminates the scattering surface of the screen 52 as far as the left-hand edge thereof, at which it adjoins the screen 54. The edge image 76 is of such a size that it illuminates the right-hand half of the scattering surface of the screen 54 between the position M and the right-hand edge thereof, at which it adjoins the screen 52.

The two partial images represent different portions of a scene. The scene includes a floor 78 provided with a line grid. In the main image, a part of the lines, for example a line L1 of the line grid, extends parallel to the lower edge of the light image 32. A second part of the lines, for example the lines L2 and L3, converges towards a common vanishing point F, as is usual in the two-dimensional representation of spatial scenes in order to arouse the impression of depth. The floor 78 is also shown in the secondary image 76. Lines L4 and L5 of the line grid however extend in the secondary image 76 at an angle to the corresponding lines L1 and L2. In particular the line L4 does not extend parallel to the lower edge of the image. The angle δ (delta) is so selected that a viewer of the overall light image 72 on the screens 52 and 54 (FIG. 3) has the impression that the lines L1 and L4 form a continuous straight line extending parallel to the lower edge of the image. Lines L5 and L6 in the second image 76, which also apparently go into the depths in the scene converge towards another vanishing point F' in the plane of the drawing in FIG. 4. The viewer of the image projected onto the screens 52 and 54 however has the impression that the lines would also converge towards the vanishing point F.

The angle δ(delta) and the position of the vanishing point F' which are involved in computation of the edge image 76 are dependent on the angle γ2 (Gamma 2) at which the screens 52 and 54 adjoin. They also depend on the orientation of the projector 18 or 20 respectively relative to the scattering surface 52 (or 54). In the embodiment of FIG. 3 the projectors 18 and 20 are so oriented that the optical axis of the projector objective and the normal to the surface of the (flat) scattering surface 52, in projection onto the plane of the drawing, extend parallel.

Before setting out the structure of the graphics computer system which is implemented in the embodiments of FIGS. 1 and 3 with the networked PCs 22 through 30, the notion of the scene graphics data file, which is central in this context, will firstly be discussed hereinafter.

The term scene graphics data file refers to the concept of scene graphics which is known inter alia from the file format VRML (Virtual Reality Modeling Language).

A scene graphics serves to describe a three-dimensional (3D) scene. The logical structure of a scene graphics is a tree structure. Branching points of that tree structure are referred to as "nodes". The origin of the tree structure is "the world". This is divided for example into nodes bearing the names "house", "tree" or "street". Each of those nodes can have a number of sub-nodes. Thus the node "house" for example can have the sub-nodes "room1", "room2" and so forth. A node comprises one or more fields which contain a given value and thus describe the state of the node. The field contained in the nodes are always provided with standard values so that the field value has to be freshly designated only in the event of deviations.

Interaction and animation are described in the VRML-world by "events" which act on nodes and correspondingly alter field contents and thus also the node state.

Different kinds of nodes are known. These include:

a) Graphic Primitives

These include for example triangles, cones, light sources, materials and textures.

b) Control Nodes

These include for example transform nodes, switch nodes or interpolation nodes. With transform nodes, all subordinate nodes are displaced in space, scaled and rotated. The display can be limited to a sub-tree of a scene graphics by means of switch nodes. Interpolation nodes predetermine paths of movement.

c) Route Nodes

Route nodes make connections between the fields of nodes. They provide so-to-speak a kind of message channel between those fields.

d) Sensor Nodes

Sensor nodes (also referred to as sensors for simplicity) react to user inputs. The sensor nodes include for example proximity, time, touch, plane, sphere and cylinder nodes. Touch sensors react to mouse clicks, while plane, sphere and cylinder nodes permit the interactive displacement of objects.

Sensors are sources for events. For example, by clicking on an object embedded in a touch sensor, with the mouse, it is possible to alter another (target) object. The mouse click is the event which is registered by the object. That sends a message or communication to the target object which thereupon changes the content of a field and thus its state. The two objects have to be previously connected together by a route.

e) Proto-Nodes

Proto-nodes are not nodes which are predetermined but which are self-defined, with also self-defined fields. Thus, it is possible to write a table proto which as field values contains the dimensions of a table and its color.

f) Script Nodes

Scripts serve for the modeling of more complex modes of behavior. They can be produced in a script language supported by VRML, VRMLScript. Scripts are linked like other nodes into a scene graphics and can send and receive events by way of routes.

For each updating of a variable 3D scene, the tree structure of the scene graphics is traversed. Variations in the scene graphics can arise on the one hand out of that itself, for example on the basis of interpolation nodes. Such variations occur therefore without user interaction, but for example on the basis of an altered state of a time sensor. Variations in the scene graphics can be caused on the other hand by user inputs, for example by a mouse click.

Various browsers are known for computing and representing scene graphics, for example the VRML97-browser Blaxxun 4.2 which is available as an open source.

Figure 5:
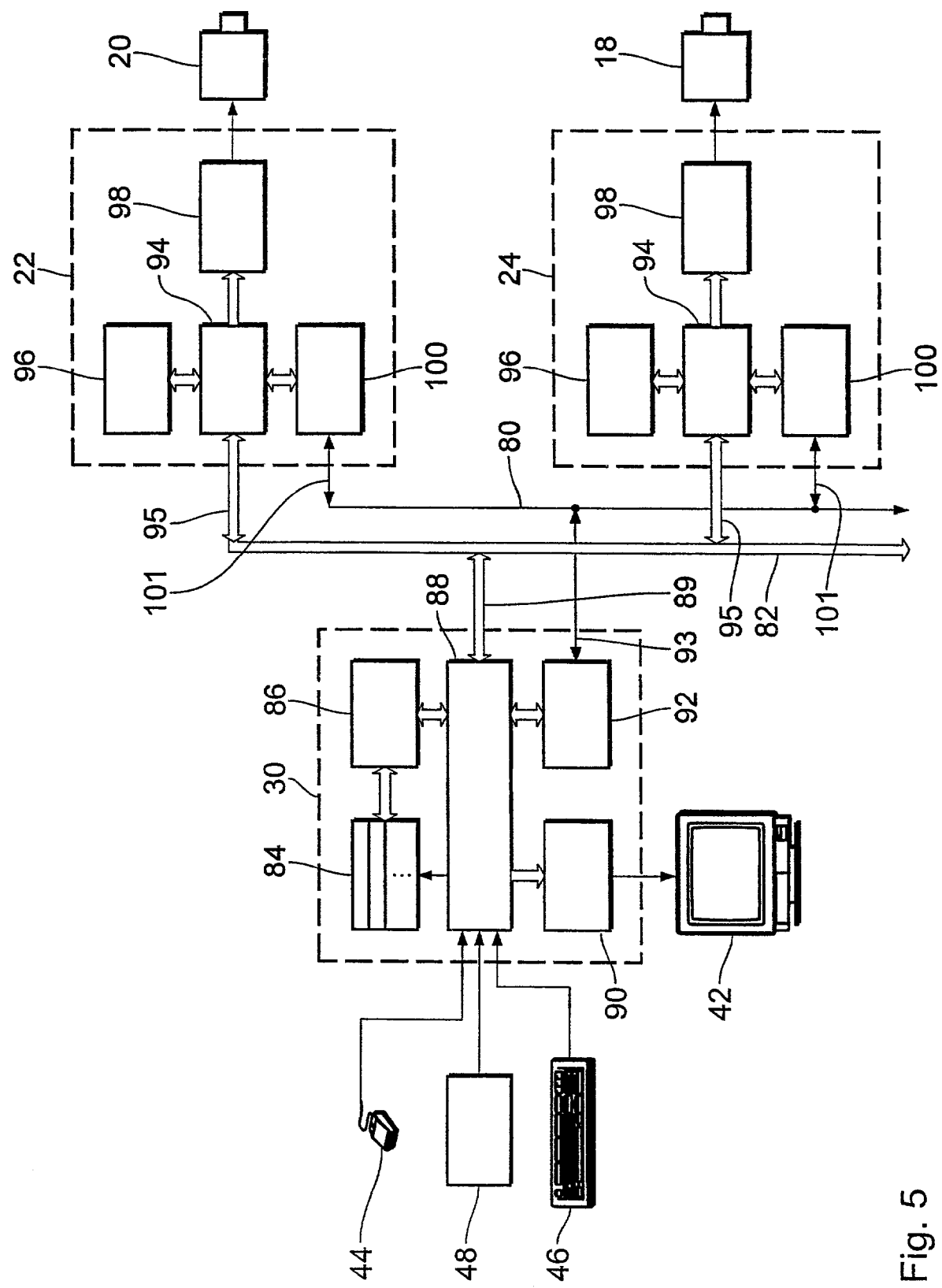
FIG. 5 shows a simplified block circuit diagram of a first embodiment of an apparatus for image data computation and for synchronous image data output, as can be used in the arrangement of FIG. 1.

FIG. 5 shows a simplified block circuit diagram of a graphics computing system, as is used in the embodiments of FIGS. 1 and 3. The drawing shows the logical structures which are implemented on the computers 22 through 30, not the implementation thereof in hardware terms.

The block circuit diagram is limited to the master 30 and the graphics computers 22 and 24 and the associated light image projectors 14 and 16 respectively. Basically, the same structure is implemented on the graphics computers 26 and 28 in the embodiments of FIGS. 1 and 3, as on the graphics computers 22 and 24. The slight differences existing will be self-evident from the description hereinafter.

The master 30 and the graphics computers 22 through 28 are connected together by way of two logical channels. On a first channel 82, the master 30 cyclically sends the clients 22 through 28 messages which serve for synchronization of the parameters used by the master and the clients for image computation and synchronization of the output of the light images computed by the clients to the associated projectors. On a second channel 80, the master and the graphics computers exchange on the one hand messages which serve primarily for constructing and maintaining the communication between the master and the graphics computers. Examples of the messages sent by way of the channels will be described in greater detail hereinafter following the description of the structure involved.

The master 30 has a scene graphics memory 84 in which one or more scene graphics data files are contained. The scene graphics memory 84 is formed for example by a hard disk or a memory region of a hard disk which is also occupied in other ways. The master 30 also has a working memory 86 into which is loaded the appropriate scene graphics data file for representing scene graphics. The working memory 86 is formed by one or more RAM units.

The master computer 30 also has a graphics master 88. The graphics master is connected on the input side to the mouse 44, the keyboard 46 and one or more input units 48. Possible input units 48 have been described hereinbefore with reference to FIG. 1. The graphics master has an input and output interface 89 which connects it to the first message channel 82.

In the present embodiment the graphics master additionally has the structural and functional features of a graphics client unit. The graphics master is therefore additionally connected by way of an image data output to a graphics computing unit 90 which in turn controls a monitor 42 by way of a signal output.

The master computer 30 further has a synchronization master 92 connected to the graphics master 88. The synchronization master has an input and output interface 93 which connects it to the second message channel 80. FIG. 5 does not show the details of the master computer 30, which deal with sound control. For that purpose the master has a 3D sound card to which an external amplifier is connected.

Substantially identical structures are embodied on the graphics computers 22 and 24. The description hereinafter is therefore limited to the graphics computer 22. In FIG. 5 identical structures of the graphics computers 22 and 24 are denoted by the same references.

The graphics computer 22 has a graphics client 94 which accesses a working memory 96. The graphics client 94 has an input and output interface 95 which connects it to the graphics master 88 by way of the first channel 82. The graphics client further has an image data output, by way of which it is connected to a graphics client unit 98. The graphics client unit in turn controls by way of its signal output operation of the projector 20.

The graphics computer 22 finally has a synchronization client 100 connected to the graphics client 94. The synchronization client 100 has an input and output interface 101 which connects it to the synchronization master 92 by way of the second channel 80.

The functional features of the graphics master 88, the graphics client 94 as well as the synchronization master 90 and the synchronization client 100 are described hereinafter.

The graphics master 88 can be implemented as a hardware component or in the form of an executable program in the master computer. The graphics master has the functional features of a VRML-browser. VRML-browsers are widely used for representing three-dimensional scenes which are written in VRML. The graphics master 88 is based on the VRML97-browser Blaxxun 4.2. The functional features of the VRML-browser include a loading process which loads a scene graphics data file from the hard disk into the working memory. In addition an image computing routine which traverses a scene graphics data file present in the working memory in dependence on received input signals of the units 44 through 46 or a signal of an internal clock (not shown here), that is to say freshly computes a part of or all scene graphics parameters contained in a scene graphics data file. The freshly computed scene graphics parameters replace or supplement the scene graphics parameters stored hitherto in the working memory. The concept of the scene graphics parameter is described in greater detail hereinafter with reference to the description of state objects. Under certain conditions, overwriting of the scene graphics data file in question in the scene graphics memory 84 is also possible. The graphics master also has routines which in dependence on the current scene graphics parameters compute the image data of a current raster image of the scene described in the scene graphics data file. In that respect, it is also possible for only a portion of the scene to be computed. The raster image comprises pixels arranged in matrix form. Each computed pixel can be described besides its matrix co-ordinates in known manner by 3 color values.

The graphics clients 94 basically involve the same functional features, but do not perform their computations like the graphics master 88 in dependence on current input unit signals. On the contrary, on the input side they are connected to the first channel 82 and receive the parameters required for updating of the respective partial image from the graphics master. That is always one image ahead in regard to image updating. An identification is fixedly associated with each of the graphics clients 94 of the individual graphics computers 22 through 28. On the basis of that identification the graphics clients 94 are in a position to compute the respective image of the next scene for the respective eye, from the parameters obtained from the graphics master. The identification can be altered if a graphics computer is to compute a different partial image for another projector.

The graphics master 88 and the graphics clients 94 have additional functional features which permit a message exchange on the first channel 82. Described hereinafter are messages which the graphics master and graphics clients exchange on the first channel 82:

a) Update Message

The graphics master 90 is always one image (frame) ahead of the graphics clients 94 in computation of the scene. After the graphics master has computed the image of the scene graphics, the scene graphics data file includes the current values thereof. With an update message, the graphics master notifies all graphics clients of the current values of the scene graphics data file for the frames previously computed thereby, which the graphics clients require in order to be able to compute their next respective partial image for the respective eye.

In order to adapt the scene graphics of the graphics clients to the current state of the scene graphics on the server, only the sensors are enclosed. All other changes in state are based on the values which the sensors supply.

An update message contains the current values of all state objects of the loaded scene graphics data file, which have changed in relation to the last-preceding image computation cycle. State objects are all objects of a scene graphics data file, whose parameter values must be identically present in respect of all graphics clients 94 in each image computation cycle in order with their respective partial images to be able to represent overall one and the same scene and which therefore have to be synchronized cycle by cycle. For example fields of sensor nodes are state objects and are therefore contained in an update message or communication if they have changed in relation to the last cycle. The state objects which are contained in the update message also include a camera position, with respect to which the scene is to be computed and the orientation of the camera.

The graphics master tests for the composition of an impending update message all state objects of the scene graphics data file, for alteration in relation to the last image computation cycle. If a change is found in a state object, the update message is expanded by the values of that state object. The overall update message is sent in one piece from the graphics master 88 to the graphics clients 94.

So that the graphics clients can identify all values of the state objects, updated by the graphics master, the graphics master 88 uses in the update message, for clear identification of state objects, an identification (ID) which is composed of:
  the file name of the scene graphics data file in question,
  the line number within the scene graphics data file, in which the state object is defined,
  the column number (or serial number of the character) within that line, from which the state object is defined,
  the type of production of the state object (for example by a script or a protonode) and, if this state object defined in that respect is multiply activated,
  an index number for each of those active state objects.

State objects are respectively applied upon first use of their identification. A distinction is drawn between identification signals for static and dynamic state objects. Dynamic state objects are automatically removed when reloading a scene graphics data file. State objects are therefore both applied when loading a scene graphics data file and also upon receipt of update messages which contain state objects. As the graphics master 88 and the graphics client 94 load the same scene, it is immaterial which of the two first applies a state object. The values are automatically adjusted upon computation of the first image of the scene.

The fact that the graphics master 90 has a one frame "lead" over the graphics clients, is of great advantage in terms of the synchronization of image computation by the graphics clients and projection of the partial images computed by same. All graphics clients receive the update message at the same moment in time and then begin with their individual image computation procedure.

Not all state objects have to be contained in an update message. Changes in the scene graphics which are caused by the input units 44 through 48 (but for example by the time sensor) do not have to be synchronized as the system time is synchronized and the changes are simultaneously effected deterministically by all graphics clients. It is therefore sufficient if only the state objects which are directly changed by the input units 44 through 48 are contained therein. All other changes in the scene graphics are automatically synchronous (for example the positions of the viewer of the objects, the execution of scripts). An exception is formed by movie nodes which can be used as textures. They are synchronized separately so that they run synchronously by all graphics clients.

b) Computation Finished Message

The computation finished message is sent by a graphics client to the master client when the graphics client in question has concluded the image calculation of "its" partial image for the next scene to be displayed. Identification of the sending graphics client is also transmitted with the computation finished message. In that way the graphics master can always associate which graphics clients have already concluded the computation and which have not yet done so.

c) Image Switching Message

The image switching message is sent to all clients at the same time by the master. With it the master at the same time gives all clients the command to output the images, the computation of which is finished, to the connected projector, by way of the respective graphics computing unit. The image switching message is only sent when the graphics master 88, after the last update message, has received a computation finished message from all active graphics clients 94.

The image switching message is a further essential element for synchronization of image projection in the arrangements of FIGS. 1 and 3. As the graphics master waits until all graphics clients are ready to output the computed partial image data to the respective graphics computing unit 98 and then all graphics clients output their respective partial image data in response to the image switching message at the same time, that ensures synchronous projection of the current partial images of the scene.

The functional features of the synchronization master 92 and the synchronization clients 100 serve primarily for initialization and control of the master/client network and for transmitting browser commands. The synchronization master 92 and the synchronization clients 100 for that purpose communicate by way of the second message channel 80. The second channel is operated on the master computer and on the graphics computers by a parallel thread. Communication is preferably effected using a UDP (User Datagram Protocol). Message interchange by way of TCP/IP (Transfer Control Protocol/Internet Protocol) is alternatively also possible, but has proven to be slower. Both variants are supported by synchronization master and clients.

The messages exchanged on the second channel 80 include:

a) Ping Message

This message corresponds to the ping message known from the TCP/IP. With the ping message, a specified addressee is requested to immediately return a ping reception message to the sender. In the present case ping messages can be sent both by the master to each client and also by each client to the master. There is no provision for communication of the clients with each other. The ping messages are used for testing timeouts of the network communication. The synchronization master 92 tests for the presence of the synchronization clients several times per second. In the case of timeouts the attempt is made to re-establish the master/client network.

b) Scene Graphics Loading Message

This message is sent by the synchronization master to all clients. It includes an URL and a scene identification number. With this message, the clients are required to load the scene graphics data file stored at the specified URL. The scene identification number, for example a whole number, is incremented with each computation and serves to identify the respectively current stage of the scene graphics.

c) Loading Complete Message

This message is sent by each of the synchronization clients to the synchronization master when, after the receipt of a scene graphics loading message from the master, loading of the scene graphics into the working memory of the graphics computer in question was concluded.

d) Rendering Mode

This message is sent by the master to all clients and as parameters includes information regarding the nature and manner of the image computation to be executed by the clients. Information relating to the rendering mode which can be contained in the message are for example wireframe on/off, Gouraud on/off, computing textures on/off, or texture filtering on/off.

e) Connection Re-Establishment Messages

In the event of absence of an answer to a ping message within a given period of time, the sender of the ping message assumes that the network communication has broken down.

If the connection breaks down as if the synchronization master crashes and is re-started, the synchronization master receives from all synchronization clients a connection re-establishment message which includes the URL and scene identification number currently loaded in the respective working memory. Not all graphics clients are always involved in computation of one and the same scene. By way of example a graphics client can still be occupied with receiving the update message, in which respect the scene identification number of the last-computed scene is still contained in the working memory. Another graphics client can already have begun on computation of the scene, in which case the scene identification number of the new scene is contained in the working memory. Therefore, the URL with the highest scene identification number is loaded into the working memory of the master computer. The synchronization master sends that URL and scene identification number to all clients. In that way after re-establishment of the connection all graphics clients are again synchronous and compute the same scene.

If a graphics client or a synchronization client crashes and is re-started, the synchronization client 100 is connected to the synchronization master and sends a connection re-establishment message which as the currently loaded URL specifies a blank character and a scene identification number 0. Thereupon with a scene graphics loading message the master sends the URL of the scene graphics to be loaded and the current scene identification number. Thereupon the client loads the scene represented by the master. The other synchronization clients ignore that message as they have already loaded that scene. Even if no crash occurred, but only a network-conditioned timeout, all instances involved, on the basis of the transmitted messages, establish that they have loaded the same scene graphics data file with the same scene identification number. Image computation and projection can be continued without re-loading or a pause. In that respect attention is directed to the description relating to FIG. 7.

f) Conclusion Message

This message is sent by the synchronization master to all synchronization clients and concludes image computation and the communication between them.

The synchronization master also manages which of the clients are active. Messages are only exchanged with active clients. Likewise the clients continuously check whether the master is still operating.

In principle any messages between the synchronization master and the synchronization clients or the graphics master and the graphics clients can be transmitted on the first and second channels. The selected distribution affords the advantage that the communication between graphics master and clients is limited to exchange of the messages which are essential for image computation and synchronization of image data output, and the graphics master and clients are therefore not loaded with additional tasks. The functional features of the synchronization master and clients can be used by different graphics masters. Basically any kind of applications can use the services of the synchronization units. Applications which execute a cyclic routine in the manner of a runtime loop are easiest to adapt to the given synchronization options.

Figure 6:
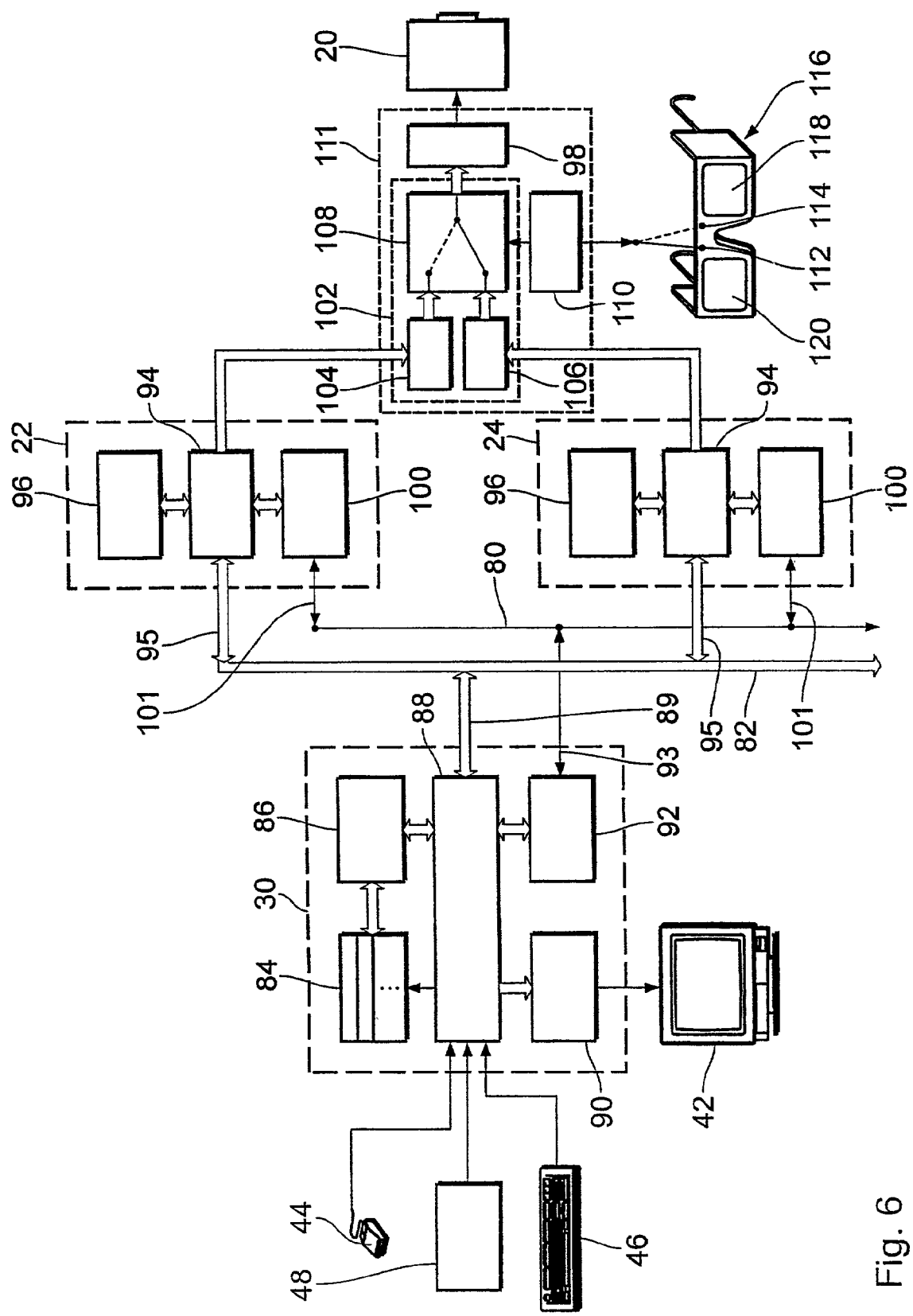
FIG. 6 shows a simplified block circuit diagram of a second embodiment of an apparatus for image data computation and for synchronous image data output which is intended in particular for use in relation to active stereo projection.

FIG. 6 shows a simplified block circuit diagram of a second embodiment of an apparatus for image data computation and synchronous image data output. The present embodiment is the same in large parts as the embodiment described with reference to FIG. 5. Therefore, in this case the same structural elements are denoted by the same references and hereinafter it is only the differences in relation to the apparatus of FIG. 5, that will be described.

The graphics clients 94 of the graphics computers 22 and 24 are connected on the output side to a partial image switching unit 102. The partial image switching unit has two image data intermediate memories 104 and 106. The first image data intermediate memory 104 is connected to the graphics client unit 94 of the graphics computer 22 and the second image data intermediate memory 106 is connected to the graphics client unit 94 of the graphics computer 24. The image data intermediate memories 104 and 106 receive the image data outputted by the associated graphics clients 94.

The image data intermediate memories 104 and 106 are both connected to the image data output of the partial image switching unit 102. At one time, either the image data contained in the image data intermediate memory 104 or the image data contained in the image data intermediate memory 106 can be outputted by way of the image data output. That is indicated in FIG. 6 by a change-over switch 108.

In addition the partial image switching unit 102 has a signal input by way of which it is connected to a switching control unit. In dependence on the state of a signal input the partial image switching unit outputs either the content of the first or the second content of the second image data intermediate memory, by way of the image data output. The image data output of the partial image switching unit 102 is connected to a graphics computing unit 98 to which once again a light image projector 20 is connected.

Control of image data output by the partial image switching unit 102 is effected by the switching control unit 110 which is connected to a signal input of the partial image switching unit 102 and in the present embodiment is integrated together with the graphics computing unit 98 into a synchronization module 111. It alternately produces a first and a second signal which is sent to the partial image switching unit. With the first signal, the partial image switching unit 102 is caused to output the content of the first image data intermediate memory 104 by way of the image data output. With the second signal, it is caused to output the content of the second image data intermediate memory 106 by way of the image data output.

The switching control unit 110 produces the first and second signals at a predeterminable signal delivery rate. A signal period includes the delivery of a first signal and a second signal. The period of time between the delivery of the first and second signals amounts to half the signal period duration. Various methods which are not shown in greater detail in FIG. 6 are possible for setting the signal delivery rate. On the one hand, the switching control unit 110 can have a frequency control with a control input for inputs from the exterior. The graphics master unit 88 for example can be connected to that input. Setting of the delivery rate by way of manual regulator can also be provided in addition or as an alternative.

The switching control unit 110 has a second signal output 110 which delivers the first and second signals in parallel with the first signal output. In the present case the signals are delivered in the form of infra-red light by way of the second signal output. They are detected by receivers 112 and 114 of a pair of shutter spectacles 116. The shutter spectacles 116 have a left-hand lens 118 and a right-hand lens 120. The light transmission of the left-hand and right-hand lenses can be electrically switched from high to low and vice-versa at high frequency (around 100 Hz). Transmission of the two lenses is always opposite so that a person wearing the pair of shutter spectacles can always only see through one lens. A change-over switching operation is caused in relation to both lenses, with the receipt of the first and second signals respectively from the switching control unit.

The shutter spectacles are controlled by means of the first signal from the switching control unit in such a way that the left-hand lens 118 is switched into a transmitting condition when the partial image for the left eye is outputted from the image data intermediate memory 104 provided for same to the graphics computing unit 98 and projected by the projector 20. At the same time the right-hand lens is switched into an opaque condition. As soon as the second signal is detected the transmission of the two lens 118 and 120 is reversed.

At the same time, by means of the second signal, the second image data intermediate memory 106 is caused to output the image data of the partial image for the right-hand eye which are converted by the graphics computing unit without perceptible delay into control signals for the projector 20 and projected thereby.

Figure 7:
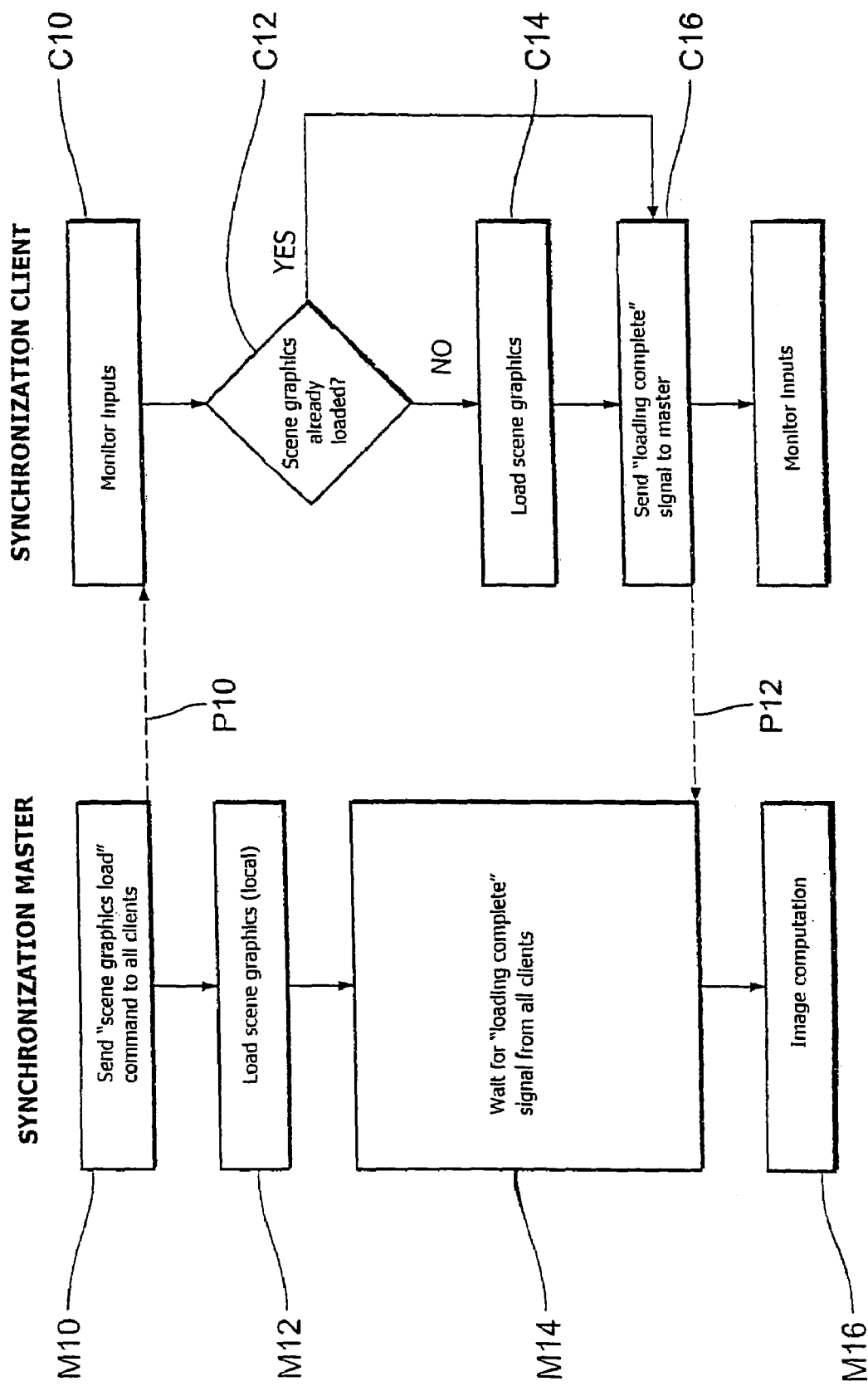
FIG. 7 shows a flow chart representing the method steps when loading a scene graphics data file.

FIG. 7 shows two parallel flow charts illustrating the sequence of the individual steps which are executed when loading a scene graphics data file to be represented by the synchronization master (left) and the synchronization client (right). In general loading of the scene graphics data file is effected only once directly prior to the beginning of representing a new scene, but in exceptional cases also after a crash on the part of a graphics computer.

The loading procedure begins with a step M10 with which the synchronization master 92 sends a "scene graphics load" command by way of the second channel 80 to all synchronization clients 100 which are monitoring their inputs in parallel with a step C10 until a message is received. Transmission of the "scene graphics load" command is symbolically indicated in FIG. 6 by a broken arrow PlO from block M1O to block C10. Besides the command as such, in that case the URL of the scene graphics data file as well as a scene identification number are communicated to the client, see above. The synchronization clients firstly check in a step C12 after the command has been received to ascertain whether the scene graphics data file in question is already loaded into the working memory of the graphics computer in question. If that is not the case the specified scene graphics data file with the values of the scene defined by the scene identification number is then loaded into the working memory, in a step C14. If it was already present there, the procedure omits step C14 and branches straightaway to step C16 with which a "loading complete" message is sent to the synchronization master 92 by way of the second channel 80. The transmission of that message is also symbolically indicated in FIG. 6 by a broken arrow P12.

In the meantime, in step M12, the synchronization master has caused loading of the scene graphics data file defined in step M10 into the local working memory 86 of the master computer 30. With step M14, the synchronization master waits until a "loading complete" message is received from all active synchronization clients. It is only when that is the case that the synchronization master, in step M16, causes commencement of the image computation and output cycle by the graphics master.

Figure 8:
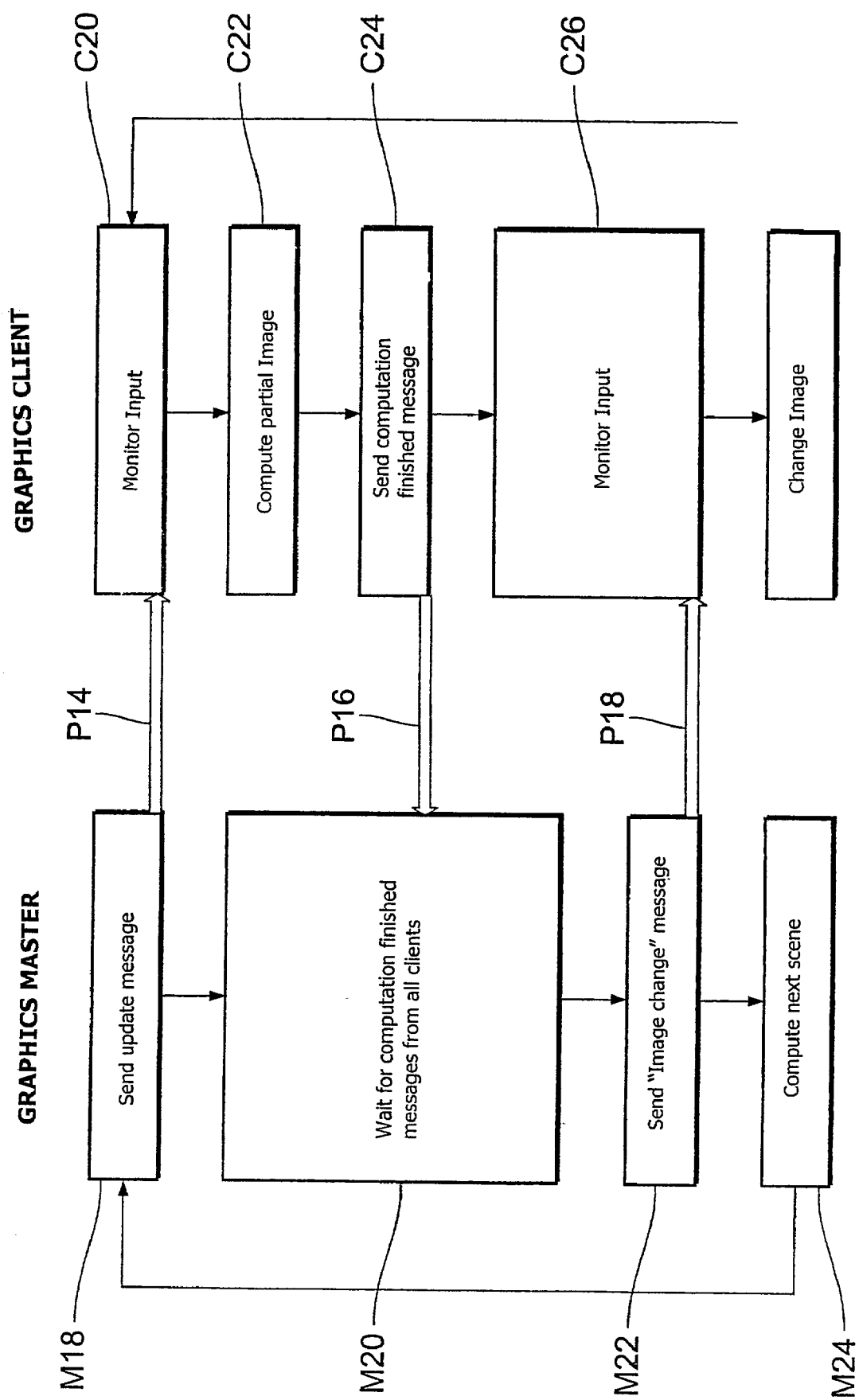
FIG. 8 shows a flow chart of a method of synchronizing the image representation.

The image computation and output cycle is again illustrated in FIG. 8 in the form of two parallel flow charts. The left-hand flow chart sets out the steps which the graphics master executes while the right-hand flow chart sets out the steps which each active graphics client executes.

The steps shown here for the graphics client are effected synchronously but not necessarily at the same time by all active graphics clients. Synchronously means here that only the transition into a new stage in the process (partial image computation, image change) is effected at the same time by all graphics clients.

Both flow charts represent process cycles which are repeatedly executed as long as no commands to a different effect intervene in the procedure from the exterior. Implementation of those cycles can be started and concluded from the exterior, more specifically by the synchronization master and the synchronization clients. Call-up of the process cycle on the graphics master is effected for example with step M16 from FIG. 7. Execution of the cycle on a graphics client 94 is interrupted for example if the synchronization client 100 connected thereto receives a "scene graphics load" message by way of the second channel 80.

The process cycle of the graphics master 88 firstly comprises a step M18 with which an update message is sent to all graphics clients 94 at the same time. Transmission of that message on the first channel 82 is symbolically indicated by an arrow P14 which goes from step M18 to a step C20 in which the graphics client 94 monitors the input of its interface to the first channel 82. After the update message is received, all graphics clients, in a step C22, execute computation of their respective partial image of the next scene to be displayed. After that step has been executed, in a step C24 each graphics client sends a "computation finished" message to the graphics master. Once again transmission of that message is indicated by an arrow P16 which goes to a step M20 of the graphics master. In that step, the graphics master 88 waits for the "computation finished" messages to be received from all active graphics clients. It is only when it has received that message from all graphics clients that the graphics master, with a step M22, sends an "image change" message by way of the first channel to all graphics clients (arrow P18). They wait for that message to be received, in a step C26. Immediately after the message is received, the graphics clients 88, with a step C28, cause an image change by output of the computed image data of their respective partial image to the respective graphics computing unit 98 which actuates the associated projector for projection of the partial image. The graphics clients then jump back to step C20. Directly after step M22 the graphics master switches over to computing the next image in order then to jump back to step M18.

If the graphics client is slower in image computation than the graphics master the update message is taken from a message buffer. The updates are adopted, and thereafter a return message is sent to the graphics master and the system waits for the image switching message. When that is received, the procedure switches over to the image which was last computed.

Figure 9:
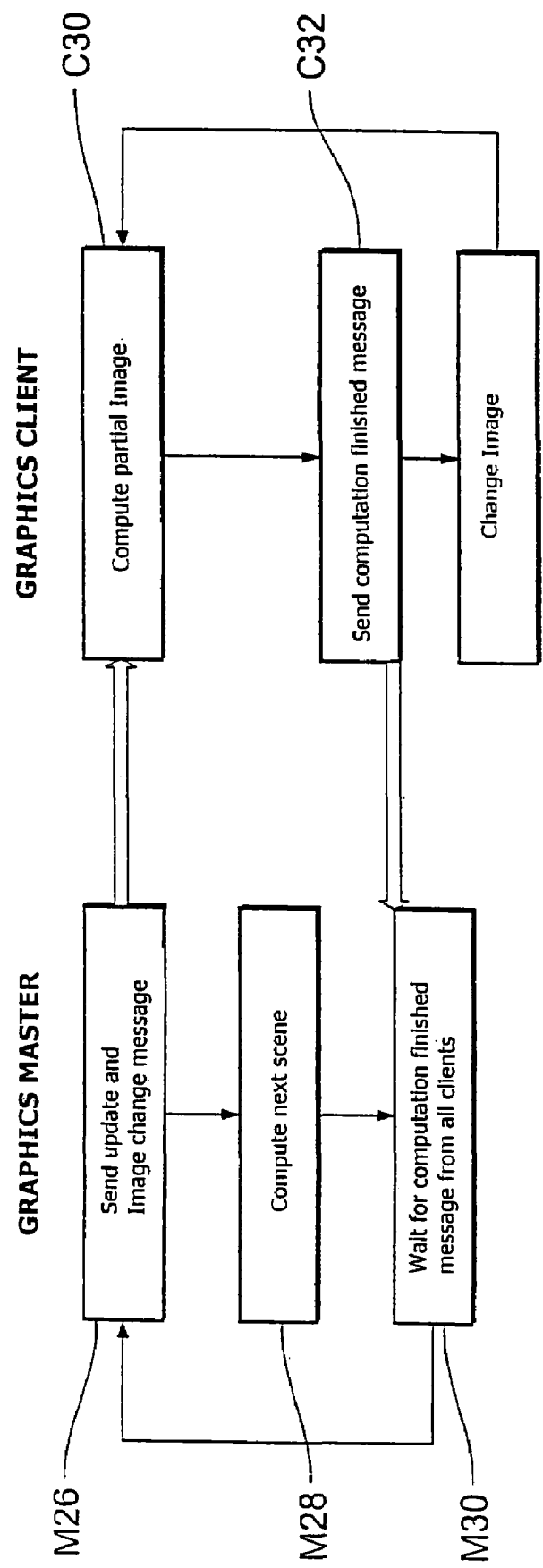
FIG. 9 shows a flow chart of an alternative method of synchronizing the image representation.

FIG. 9 shows an alternative procedure which differs from that shown in FIG. 8 in that the graphics master unit 88 sends a combined update and image change message in a step M26. In a step M28 the graphics master unit then recomputes the field values of the currently loaded scene graphics data file. Upon receipt of the "computation finished" message from all graphics clients (M30) the next update and image change message is sent (M24). After receipt of the update and image change message the graphics client unit computes its partial image (C30), thereafter signals to the graphics master unit the conclusion of the image computation procedure (C32) and then outputs the image data of the computed partial image (C32). In comparison with the method illustrated in FIG. 8 the process of the graphics client unit eliminates steps for waiting for messages to be received from the graphics master unit.

What is claimed is:

1. A virtual reality computing apparatus comprising:
   at least one signal input which is connectable to an external input unit;
   a first message channel;
   a graphics master unit
      which has a first random access memory
         adapted to receive and store a first scene graphics data file,
         which first scene graphics data file defines objects and/or events of a three-dimensional scene according to a code of a virtual reality modeling language and by means of object and/or event parameter values associated with the objects and/or events, respectively,
         which associate object and event parameter values respectively with the objects and/or events,
         and which objects and/or event parameters are defined in the code of the virtual reality modeling language in a manner allowing a computation of partial images or of a sequence of consecutive partial images, so as to enable a three-dimensional perception of the three-dimensional scene by a human viewer by synchronously displaying the partial images as a composite image,
      is connected to the signal input,
      is connected by way of a first message interface for incoming and outgoing messages to the first message channel
      and which is adapted
      to re-compute and store the object and/or event parameter values of the first scene graphics data file according to the code of the virtual reality modeling language in dependence on the current object and/or event parameter values thereof and on the current state of the signal input
      and to produce and send a first message by way of the first message interface, wherein the first message contains at least a part of the freshly computed object and/or event parameter values according to the code of the virtual reality modeling language; and
   at least two graphics client units, wherein each graphics client unit
      has a respective second random access memory which is adapted to receive and store a respective second scene graphics data file, which defines objects and/or events identical to those of the first scene graphics data file in the code of the virtual reality modeling language and by means of object and/or event parameter values associated with the objects and/or events, respectively, as received from the graphics master unit with the first message, is connected by way of a second message interface for incoming and outgoing messages to the first message channel, has a respective image data output, and is adapted to receive the first message comprising the re-computed current object and/or event parameter values by way of the second message interface and to store the received object and/or event parameter values in the respective second scene graphics data file, thus overwriting the previously stored respective second scene graphics data file, to compute, after having overwritten the previously stored respective second scene graphics data file, respective image data of a respective partial image of the three-dimensional scene in dependence on the object and/or event parameter values of the second scene graphics data file, such that all partial images of the three-dimensional scene computed by the graphics clients units, when synchronously displayed together, allow a three-dimensional perception of the three-dimensional scene by a human viewer, to produce and send a second message to the graphics master unit by way of the second message interface which second message signals the conclusion of the image data computation of the respective partial image by the respective graphics client unit, and to output the respective image data of the respective partial image after having sent the second message to the graphics master unit.

2. The apparatus of claim 1 wherein the graphics master unit is additionally adapted to produce a third message and to send the third message to each graphics client unit after receiving the second message from each graphics client unit and each graphics client unit is additionally adapted to output the image data at the image data output after receiving the third message.

3. The apparatus of claim 2, wherein the graphics master unit has writing and reading access to a third random access memory which is connected to the second random access memory and in which at least one scene graphics data file is stored, wherein a respective memory address and/or scene graphics identification number is associated with each scene graphics data file contained in the third random access memory.

4. The apparatus of claim 3, further comprising:
a second message channel, associated with the graphics master unit; and
a synchronization master unit connected to the graphics master unit, having a third message interface for incoming and outgoing messages, which connects same to the second message channel, and which is adapted to produce a fourth message in which is contained the memory address of a scene graphics data file and/or the scene identification number of the scene graphics data file and to send the fourth message by way of the third message interface, associated with each graphics client unit a respective synchronization client unit connected to the associated graphics client unit, having a fourth message interface which connects it to the second message channel and which is adapted to receive the fourth message at the fourth message interface and to subsequently cause loading of the scene graphics data file defined in the fourth message into the second data memory and to produce and send a fifth message which signals conclusion of loading of the scene graphics data file, to the synchronization master unit by way of the fourth message interface.

5. The apparatus of claim 4, wherein the synchronization master unit and the synchronization client unit respectively are additionally adapted to produce a first test message and a second test message respectively, to produce a first test answer message after reception of the second test message at the third message interface and to produce a second test answer message after reception of the first test message at the fourth message interface, and to send the respective test and test answer message by way of the second message channel.

6. The apparatus of claim 5, wherein the graphics master unit is adapted for real-time computation of the object and event parameters and the graphics client unit is adapted for real-time image data computation.

7. The apparatus of claim 6, wherein the graphics client unit and the graphics master unit are in the form of browsers for the file format VRML, Inventor, Performer and/or X3D.

8. The apparatus of claim 7, further comprising:
in association with each graphics client unit, a respective graphics computing unit having a data input for image data, by way of which it is connected to the associated graphics client unit which has a signal output for control signals for controlling a display unit of an image reproduction device and which is adapted to convert image data received at the input into control signals and to output the control signals by way of the signal output.

9. The apparatus of claim 7, further comprising:
a partial image switching unit for each two graphics client units, having a signal input, at least one first and at least one second image data input which are each associated with a respective graphics client unit, a first and a second image data intermediate memory connected to the first and second image data input respectively, an image data output for each pair of first and second image data inputs, which is adapted to output the image data either of the first or the second image data intermediate memory by way of the image data output in dependence on the state of the signal input, and a switching control unit which is connected at the output side to the signal input of the partial image switching unit and which is adapted to produce and deliver at least one control signal at a predeterminable signal delivery frequency.

10. The apparatus of claim 9, further comprising:
a graphics computing unit which is connected to the image data output of the partial image switching unit which has a signal output for control signals for controlling a display unit of an image reproduction device, and which is adapted to convert image data received at the input into control signals and to output the control signals by way of the signal output.

11. The apparatus of claim 1, wherein the graphics master unit has writing and reading access to a third random access memory which is connected to the second random access memory and in which at least one scene graphics data file is stored, wherein a respective memory address and/or scene graphics identification number is associated with each scene graphics data file contained in the third random access memory.

12. The apparatus of claim 1, further comprising:
a second message channel, associated with the graphics master unit; and
a synchronization master unit connected to the graphics master unit, having a third message interface for incoming and outgoing messages, which connects same to the second message channel, and which is adapted to produce a fourth message in which is contained the memory address of a scene graphics data file and/or the scene identification number of the scene graphics data file and to send the fourth message by way of the third message interface, associated with each graphics client unit a respective synchronization client unit connected to the associated graphics client unit, having a fourth message interface which connects it to the second message channel and which is adapted to receive the fourth message at the fourth message interface and to subsequently cause loading of the scene graphics data file defined in the fourth message into the second data memory and to produce and send a fifth message which signals conclusion of loading of the scene graphics data file, to the synchronization master unit by way of the fourth message interface.

13. The apparatus of claim 12, wherein the synchronization master unit and the synchronization client unit respectively are additionally adapted to produce a first test message and a second test message respectively, to produce a first test answer message after reception of the second test message at the third message interface and to produce a second test answer message after reception of the first test message at the fourth message interface, and to send the respective test and test answer message by way of the second message channel.

14. The apparatus of claim 1, wherein the graphics master unit is adapted for real-time computation of the object and event parameters and the graphics client unit is adapted for real-time image data computation.

15. The apparatus of claim 14, wherein the graphics client unit and the graphics master unit are in the form of browsers for the file format VRML, Inventor, Performer and/or X3D.

16. The apparatus of claim 1, further comprising:
in association with each graphics client unit, a respective graphics computing unit having a data input for image data, by way of which it is connected to the associated graphics client unit which has a signal output for control signals for controlling a display unit of an image reproduction device and which is adapted to convert image data received at the input into control signals and to output the control signals by way of the signal output.

17. The apparatus of claim 1, further comprising:
a partial image switching unit for each two graphics client units, having a signal input, at least one first and at least one second image data input which are each associated with a respective graphics client unit, a first and a second image data intermediate memory connected to the first and second image data input respectively, an image data output for each pair of first and second image data inputs, which is adapted to output the image data either of the first or the second image data intermediate memory by way of the image data output in dependence on the state of the signal input, and a switching control unit which is connected at the output side to the signal input of the partial image switching unit and which is adapted to produce and deliver at least one control signal at a predeterminable signal delivery frequency.

18. The apparatus of claim 17, further comprising:
a graphics computing unit which is connected to the image data output of the partial image switching unit which has a signal output for control signals for controlling a display unit of an image reproduction device, and which is adapted to convert image data received at the input into control signals and to output the control signals by way of the signal output.

* * * * *